US011243865B2

(12) United States Patent
Chiba

(10) Patent No.: US 11,243,865 B2
(45) Date of Patent: Feb. 8, 2022

(54) INFORMATION PROCESSING SYSTEM, METHOD, AND STORAGE MEDIUM

(71) Applicant: NEC Corporation, Tokyo (JP)

(72) Inventor: Yasunobu Chiba, Tokyo (JP)

(73) Assignee: NEC CORPORATION, Tokyo (JP)

( * ) Notice: Subject to any disclaimer, the term of this patent is extended or adjusted under 35 U.S.C. 154(b) by 555 days.

(21) Appl. No.: 16/305,437

(22) PCT Filed: Jun. 12, 2017

(86) PCT No.: PCT/JP2017/021561
§ 371 (c)(1),
(2) Date: Nov. 29, 2018

(87) PCT Pub. No.: WO2017/217349
PCT Pub. Date: Dec. 21, 2017

(65) Prior Publication Data
US 2020/0319990 A1    Oct. 8, 2020

(30) Foreign Application Priority Data

Jun. 13, 2016  (JP) .............................. JP2016-117145

(51) Int. Cl.
*G06F 11/34* (2006.01)
*G06F 11/30* (2006.01)
*G06F 16/00* (2019.01)

(52) U.S. Cl.
CPC ...... *G06F 11/3476* (2013.01); *G06F 11/3072* (2013.01); *G06F 11/3089* (2013.01); *G06F 16/00* (2019.01)

(58) Field of Classification Search
CPC ............. G06F 11/3072; G06F 11/3089; G06F 11/3476; G06F 16/00
See application file for complete search history.

(56) References Cited

U.S. PATENT DOCUMENTS 6,466,980 B1    10/2002  Lumelsky et al.
7,155,514 B1 *  12/2006  Milford .................. H04L 41/06
                                                709/225

(Continued)

FOREIGN PATENT DOCUMENTS

JP    2001-167098 A    6/2001
JP    2004-326480 A    11/2004

(Continued)

OTHER PUBLICATIONS

Nathan Marz, James Warren, "Big Data: Principles and best practices of scalable real-time data systems", (The United States of America), 1st Edition, Manning Publication, May 10, 2015, 300 pages.

(Continued)

*Primary Examiner* — Walter L Lindsay, Jr.
*Assistant Examiner* — Geoffrey T Evans
(74) *Attorney, Agent, or Firm* — Sughrue Mion, PLLC

(57) ABSTRACT

An information processing system according to the present invention includes: an analysis device; and a control device. The analysis device performs first operations. The first operations includes: executing analysis, based on an analysis rule with respect to data to be input as an object of analysis; outputting an analysis result; managing the analysis rule; The analysis device store the analysis rule; and analysis state information indicating a state of the analysis to be generated or referred to by the first processor. The control device performs second operations. The second operations includes: monitoring a usage status of the first memory storing the analysis state information; acquiring and managing an evaluation result with respect to the analysis result; and controlling the analysis rule via the analysis device, based on a usage status of the first memory storing the analysis state information and the evaluation result.

6 Claims, 26 Drawing Sheets

(56) References Cited

U.S. PATENT DOCUMENTS

| | | |
|---|---|---|
| 7,260,844 B1 | 8/2007 | Tidwell et al. |
| 7,376,969 B1 | 5/2008 | Njemanze et al. |
| 2008/0201772 A1* | 8/2008 | Mondaeev .............. H04L 63/20 726/13 |
| 2011/0219035 A1* | 9/2011 | Korsunsky .............. G06F 21/00 707/784 |
| 2014/0336984 A1* | 11/2014 | Starr .................. G05B 23/0235 702/183 |
| 2020/0067861 A1* | 2/2020 | Leddy ..................... H04L 51/12 |

FOREIGN PATENT DOCUMENTS

| | | |
|---|---|---|
| JP | 2005-38073 A | 2/2005 |
| JP | 3627005 B2 | 3/2005 |
| JP | 2007-172260 A | 7/2007 |
| JP | 2012-238207 A | 12/2012 |

OTHER PUBLICATIONS

International Search Report dated Aug. 15, 2017 issued by the International Search Report in PCT/JP2017/021561.
Written Opinion dated Aug. 15, 2017 issued by the International Search Report in PCT/JP2017/021561.

* cited by examiner

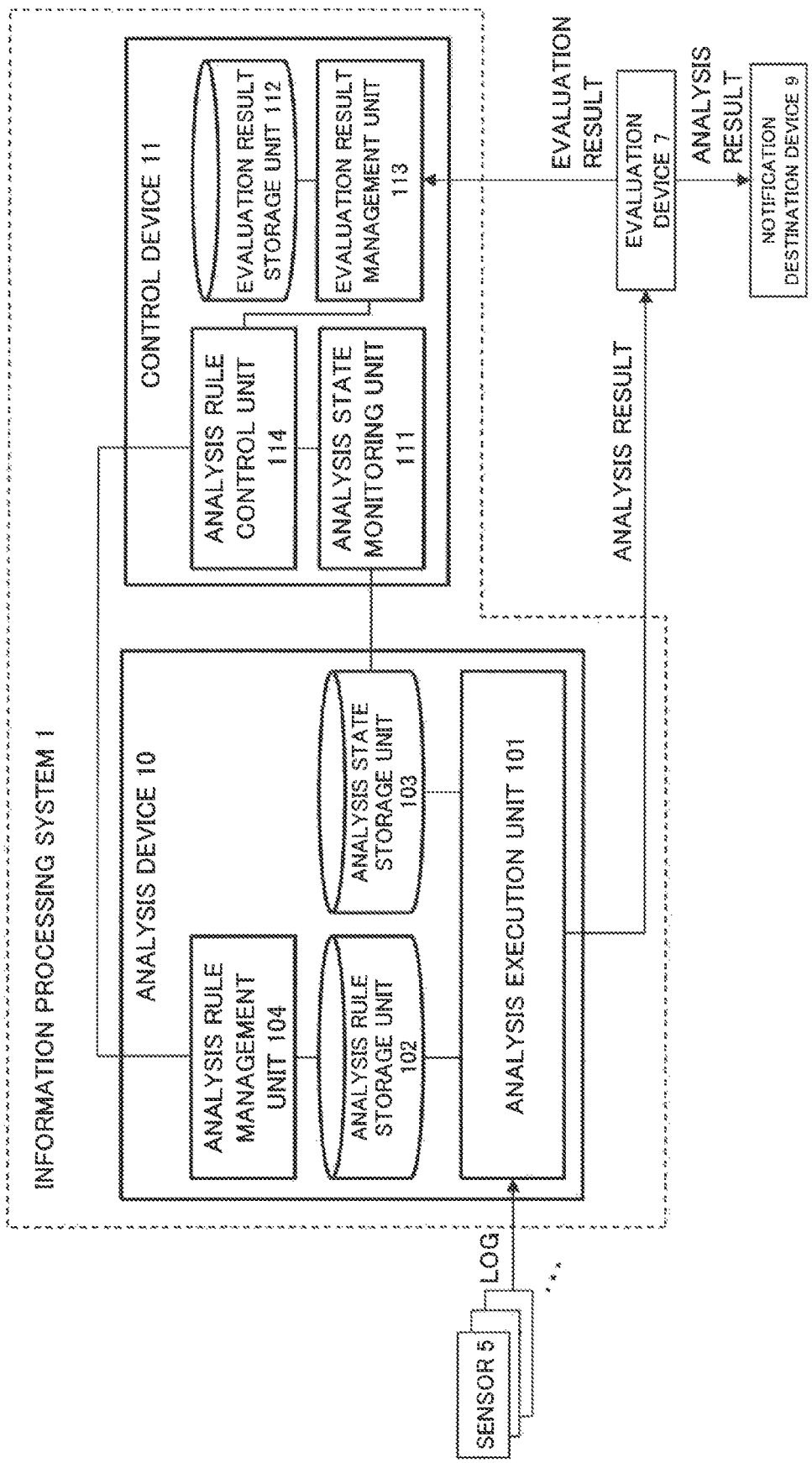

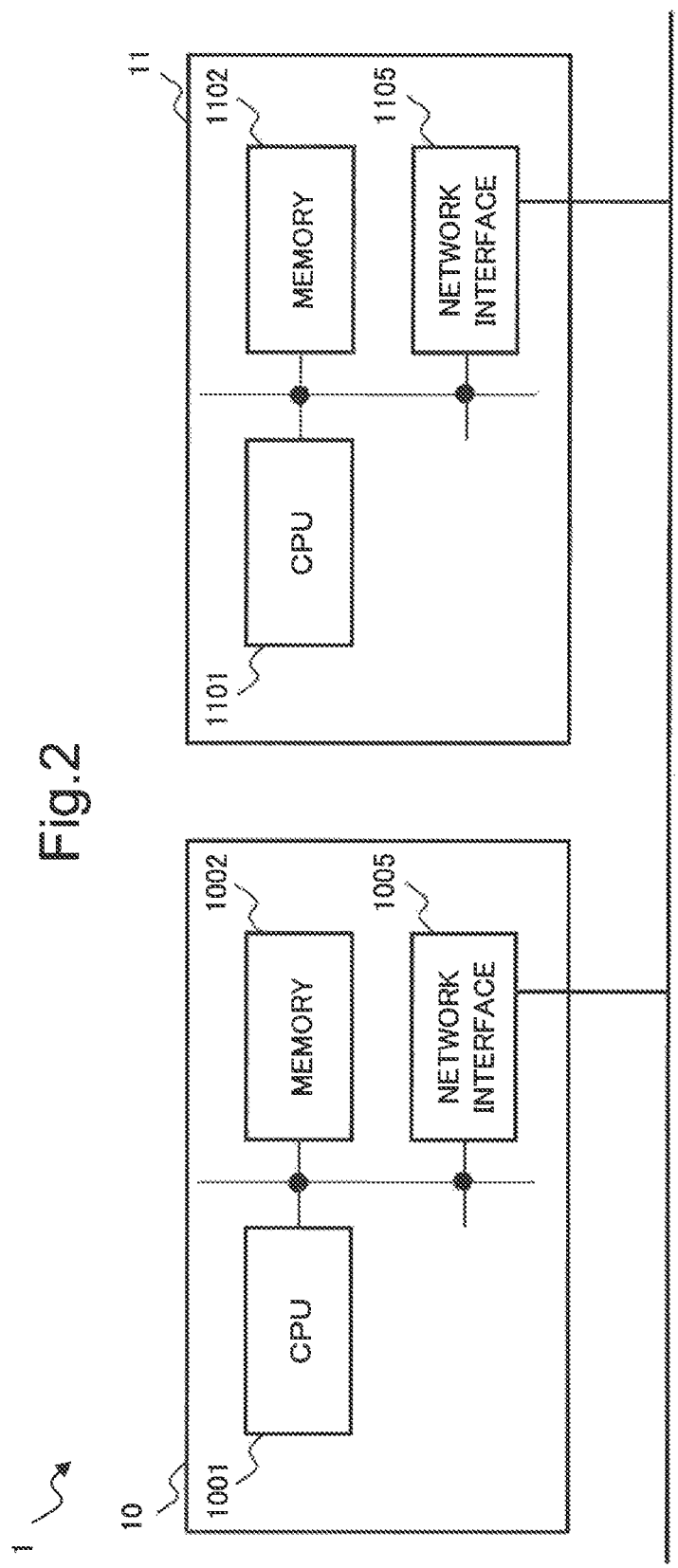

Fig.3

| ID | ANALYSIS RULE | VALIDITY |
|---|---|---|
| 1 | Customer ID = 1 and Signature ID = 32, Count >= 5, Time Window = 10 Minutes | VALID |
| 2 | Customer ID = 2 and Source IP Address = 10.0.0.1 and Destination IP Address = 10.0.0.2, Count >= 2, Time Window = 1 Minutes | VALID |
| 3 | Customer ID = Unique and Signature ID = 96 and Signature ID = 128, Count >= 1, Time Window = 12 Hours | VALID |
| ... | ... | ... |
| 1000 | Customer ID = Unique and Signature ID = 32 and Signature ID = 64, Count >= 1, Time Window = 4 Hours | VALID |

Fig.4

| ANALYSIS RULE ID | ANALYSIS STATE INFORMATION |
|---|---|
| 1 | Detected At = 1453448586.923002638, Count = 1<br>Detected At = 1453448628.885667185, Count = 1<br>Detected At = 1453448639.857580021, Count = 1<br>Detected At = 1453448653.592506500, Count = 1 |
| 2 | Detected At = 1453448639.898712983, Count = 1 |
| 3 | Detected At = 1453448586.923002619, Count = 1, Customer ID = 2, Signature ID = 96<br>Detected At = 1453448586.923002640, Count = 1, Customer ID = 9, Signature ID = 96<br>Detected At = 1453448601.039000729, Count = 1, Customer ID = 7, Signature ID = 96<br>Detected At = 1453448609.223032091, Count = 1, Customer ID = 4, Signature ID = 96<br>Detected At = 1453448610.193848313, Count = 1, Customer ID = 5, Signature ID = 96<br>Detected At = 1453448612.313912356, Count = 1, Customer ID = 3, Signature ID = 96 |
| 1000 | Detected At = 1453448586.923002638, Count = 1, Customer ID = 1, Signature ID = 32<br>Detected At = 1453448586.923002638, Count = 1, Customer ID = 2, Signature ID = 32<br>Detected At = 1453448601.039000700, Count = 1, Customer ID = 9, Signature ID = 32<br>Detected At = 1453448609.223030290, Count = 1, Customer ID = 8, Signature ID = 64<br>Detected At = 1453448610.193847451, Count = 1, Customer ID = 4, Signature ID = 32<br>Detected At = 1453448612.313440120, Count = 1, Customer ID = 5, Signature ID = 32 |

Fig.5

| EVALUATION COMPLETION TIME | ANALYSIS RULE ID | EVALUATION RESULT |
|---|---|---|
| 2016/01/22 17:00.00 | 3 | FALSE POSITIVE |
| 2016/01/22 17:01.30 | 3 | FALSE POSITIVE |
| 2016/01/22 17:02.09 | 1 | TRUE POSITIVE |
| 2016/01/22 17:01.30 | 3 | FALSE POSITIVE |
| 2016/01/22 17:10.45 | 1000 | TRUE POSITIVE |

Fig. 14

| ID | ANALYSIS RULE | VALIDITY |
|---|---|---|
| 1 | Customer ID = 1 and Signature ID = 32, Count >= 5, Time Window = 10 Minutes | INVALID |
| 2 | Customer ID = 2 and Source IP Address = 10.0.0.1 and Destination IP Address = 10.0.0.2, Count >= 2, Time Window = 1 Minutes | INVALID |
| 3 | Customer ID = Unique and Signature ID = 96 and Signature ID = 128, Count >= 1, Time Window = 12 Hours | INVALID |
| ... | ... | ... |
| 1000 | Customer ID = Unique and Signature ID = 32 and Signature ID = 64, Count >= 1, Time Window = 4 Hours | INVALID |

Fig. 15

| RECEPTION TIME | Customer ID | Signature ID | Source IP Address | Destination IP Address |
|---|---|---|---|---|
| 1453448586.923002619 | 2 | 96 | 10.0.1.1 | 10.0.1.2 |
| 1453448586.923002638 | 1 | 32 | 10.0.0.3 | 10.0.0.4 |
| 1453448586.923002638 | 1 | 32 | 10.0.0.2 | 10.0.0.9 |
| 1453448586.923002638 | 1 | 32 | 10.0.0.3 | 10.0.0.4 |
| 1453448586.923002638 | 2 | 32 | 10.0.1.2 | 10.0.1.3 |
| 1453448586.923002640 | 9 | 96 | 192.168.32.9 | 192.168.32.1 |
| 1453448601.039000700 | 9 | 32 | 192.168.32.254 | 192.168.32.4 |
| 1453448601.039000729 | 7 | 96 | 172.16.16.64 | 172.168.16.4 |
| 1453448609.223030290 | 8 | 64 | 172.16.0.1 | 172.16.0.2 |
| 1453448609.223032091 | 4 | 96 | 10.255.0.1 | 10.255.0.254 |
| 1453448610.193847451 | 4 | 32 | 10.255.0.16 | 10.255.0.17 |
| 1453448610.193848313 | 5 | 96 | 192.168.0.1 | 192.168.0.2 |
| 1453448612.313440120 | 5 | 32 | 192.168.0.1 | 192.168.0.2 |
| 1453448612.313912356 | 3 | 96 | 10.0.16.16 | 10.0.16.254 |
| 1453448628.885667185 | 1 | 32 | 10.0.0.1 | 10.0.0.9 |
| 1453448639.857580021 | 1 | 32 | 10.0.0.2 | 10.0.0.1 |
| 1453448653.592506500 | 1 | 32 | 10.0.0.9 | 10.0.0.3 |

Fig.16

| EVALUATION COMPLETION TIME | ANALYSIS DEVICE ID | ANALYSIS RULE ID | EVALUATION RESULT |
|---|---|---|---|
| 2016/01/22 17:00.00 | A | 3 | FALSE POSITIVE |
| 2016/01/22 17:01.30 | A | 3 | FALSE POSITIVE |
| 2016/01/22 17:02.09 | A | 1 | TRUE POSITIVE |
| 2016/01/22 17:01.30 | A | 3 | FALSE POSITIVE |
| ⋮ | | | |
| 2016/01/22 17:10.45 | A | 1000 | TRUE POSITIVE |
| ⋮ | | | |

INFORMATION PROCESSING SYSTEM, METHOD, AND STORAGE MEDIUM

This application is a National Stage Entry of PCT/JP2017/021561 filed on Jun. 12, 2017, which claims priority from Japanese Patent Application 2016-117145 filed on Jun. 13, 2016, the contents of all of which are incorporated herein by reference, in their entirety.

TECHNICAL FIELD

The present invention relates to a technique of collecting and analyzing information.

BACKGROUND ART

There is a technique of collecting and analyzing information.

For example, Patent Literature (PTL) 1 discloses a technique of detecting a threat by receiving security events from various types of sensors and analyzing the received security events. According to PTL 1, the related art receives, from a software agent, a security event including a destination address and an event signature. A received event signature is used for identifying a set of vulnerability, which is used by a security event. Further, a destination address is used for identifying a resource within a target network. Furthermore, the related art extracts a set of vulnerability included by a target resource, by referring to a resource model (information including an internet protocol (IP) address, a host name, vulnerability, and the like). Then, the related art detects a threat by comparing a set of vulnerability used by a security event, with a set of vulnerability included by a target resource.

Further, PTL 2 discloses a technique of generating a meta-event by collecting security events from a wide variety of network devices and analyzing the collected security events. The related art generates a meta-event by normalizing collected security events into a common format and applying a group of rules to the normalized security events. In PTL 2, a rule engine for applying a group of rules stores event information for a set fixed time, in order to apply the group of rules.

Further, PTL 3 discloses a technique of adjusting a capacity of an object-resource depending on a demand for an object-resource from a client in a distributed network of a server. According to PTL 3, the related art dynamically predicts a demand, based on a demand in the past, a district to be input, a cost requirement, and the like, and adjusts a capacity depending on the predicted demand, in order to cause a capacity of an object-resource on a server to be equal to a predicted required capacity.

Further, PTL 4 describes a technique of generating new analysis processing, based on an analysis result of data. According to PTL 4, the related art generates new analysis processing by calculating a feature amount of an analysis result and applying an inference rule to an analysis result in which the feature amount satisfies a predetermined condition.

Further, PTL 5 describes a technique of correcting a rule for checking validity of a content of a document. The related art checks a target document by a predetermined rule, and corrects the rule, based on an evaluation result with respect to a check result.

Further, Non Patent Literature (NPL) 1 discloses a generalized and scalable data processing system having high fault tolerance.

CITATION LIST

Patent Literature

[PTL 1] U.S. Pat. No. 7,260,844
[PTL 2] U.S. Pat. No. 7,376,969
[PTL 3] Japanese Patent No. 3627005
[PTL 4] Japanese Unexamined Patent Application Publication No. 2012-238207
[PTL 5] Japanese Unexamined Patent Application Publication No. 2007-172260

Non Patent Literature

[NPL 1] Nathan Marz, James Warren, "Big Data: Principles and best practices of scalable realtime data systems", (The United States of America), 1st Edition, Manning Publication, May 10, 2015

SUMMARY OF INVENTION

Technical Problem

As described in PTLs 1 and 2, in order to detect a security threat or violation in an information communication system, there is a need for collecting information from a wide variety of information processing devices, communication equipment, and the like, and analyzing the collected information, based on a predefined procedure. Further, as described in NPL 1, there is a need for collecting a large amount of information from a wide variety of devices, and executing real-time analysis, not applying only to a security application. As described in PTL 2, when analysis is executed, it is necessary to store information indicating a state relating to analysis by using a primary storage device, a secondary storage device, and the like, in an information processing system. However, when an amount or content of information being an object of analysis (input to a system) changes, it may be impossible to store information indicating a state relating to analysis, due to a constraint of the primary storage device or the secondary storage device. In this case, there occurs an issue that execution of desired analysis may not be continued. This issue is particularly salient in an application where it is difficult to predict an amount or content of information being an object of analysis.

Further, although PTL 3 describes controlling a system in such a way as to meet a demand by predicting a demand in the future (input to a system), PTL 3 is based on a premise that prediction of a demand is possible. PTL 3 fails to suggest a technique of solving the above-described issue in a condition where it is difficult to predict a demand.

Further, although PTLs 4 and 5 describe that new analysis is executed, based on an analysis result or an evaluation result with respect to the analysis result, PTLs 4 and 5 fail to suggest a technique of solving the above-described issue in a condition where it is not possible to predict an amount or content of information being an object of analysis.

The present invention is made in order to solve the above-described issues. Specifically, an object of the present invention is to provide a technique of more reliably continuing execution of analysis, in an application where it is difficult to predict an amount or content of information to be input as an object of analysis.

Solution to Problem

For achieving above-object, an information processing system according to the present invention includes: an analysis device; and a control device.

The analysis device includes
a first memory, and
at least one first processor coupled to the first memory.
The first processor performs first operations. The first operations includes
executing analysis, based on an analysis rule with respect to data to be input as an object of analysis, outputting an analysis result, and
managing the analysis rule.
The first memory
stores the analysis rule, and
stores analysis state information indicating a state of the analysis to be generated or referred to by the first processor.
The control device including includes
a second memory, and
at least one second processor coupled to the second memory.
The second processor performs second operations. The second operations includes
monitoring a usage status of storing analysis state information,
acquiring and managing an evaluation result with respect to the analysis result,
and
controlling the analysis rule via the analysis device, based on a usage status of the first memory storing the analysis state information and the evaluation result.
The second memory stores the evaluation result.
An analysis device according to the present invention is configured as an analysis device in the above-mentioned information processing system.
A control device according to the present invention is configured as a control device in the above-mentioned information processing system.
A method according to the present invention is for a computer device to an analysis device. The analysis device includes a first memory, and at least one first processor coupled to the first memory. The first processor performing first operations.
The first operations includes
executing analysis, based on an analysis rule with respect to data to be input as an object of analysis, outputting an analysis result, managing the analysis rule. The first memory stores the analysis rule, and analysis state information indicating a state of the analysis to be generated or referred to by the first processor. The method includes:
monitoring a usage status of the first memory storing the analysis state information;
acquiring and managing an evaluation result with respect to the analysis result; and
controlling the analysis rule via the analysis device, based on a usage status of the first memory storing the analysis state information and the evaluation result.
A non-transitory computer-readable storage medium according to the present invention stores a program causing a computer device to perform a method to an analysis device. The analysis device includes a first memory, and at least one first processor coupled to the first memory. The first processor performing first operations. The first operations includes executing analysis, based on an analysis rule with respect to data to be input as an object of analysis, outputting an analysis result, and managing the analysis rule. The first memory stores the analysis rule, and analysis state information indicating a state of the analysis to be generated or referred to by the first processor. The method includes:
monitoring a usage status of the first memory storing the analysis state information;
acquiring and managing an evaluation result with respect to the analysis result;
and
controlling the analysis rule via the analysis device, based on a usage status of the first memory storing the analysis state information and the evaluation result.

Advantageous Effects of Invention

The present invention is able to provide a technique of more reliably continuing execution of analysis in an application where it is difficult to predict an amount or content of information to be input as an object of analysis.

BRIEF DESCRIPTION OF DRAWINGS

FIG. 1 is a block diagram illustrating a configuration of an information processing system in a first example embodiment according to the present invention.

FIG. 2 is a diagram illustrating an example of a hardware configuration of the information processing system in the first example embodiment according to the present invention.

FIG. 3 is a diagram illustrating an example of information to be stored in an analysis rule storage unit in the first example embodiment according to the present invention.

FIG. 4 is a diagram illustrating an example of information to be stored in an analysis state storage unit in the first example embodiment according to the present invention.

FIG. 5 is a diagram illustrating an example of information to be stored in an evaluation result storage unit in the first example embodiment according to the present invention.

FIG. 14 is a diagram illustrating an example of information to be stored in an analysis rule storage unit in the second example embodiment according to the present invention.

FIG. 15 is a diagram illustrating an example of information to be stored in a log storage unit in the second example embodiment according to the present invention.

FIG. 16 is a diagram illustrating an example of information to be stored in an evaluation result storage unit in the second example embodiment according to the present invention.

EXAMPLE EMBODIMENT

Figure 6:
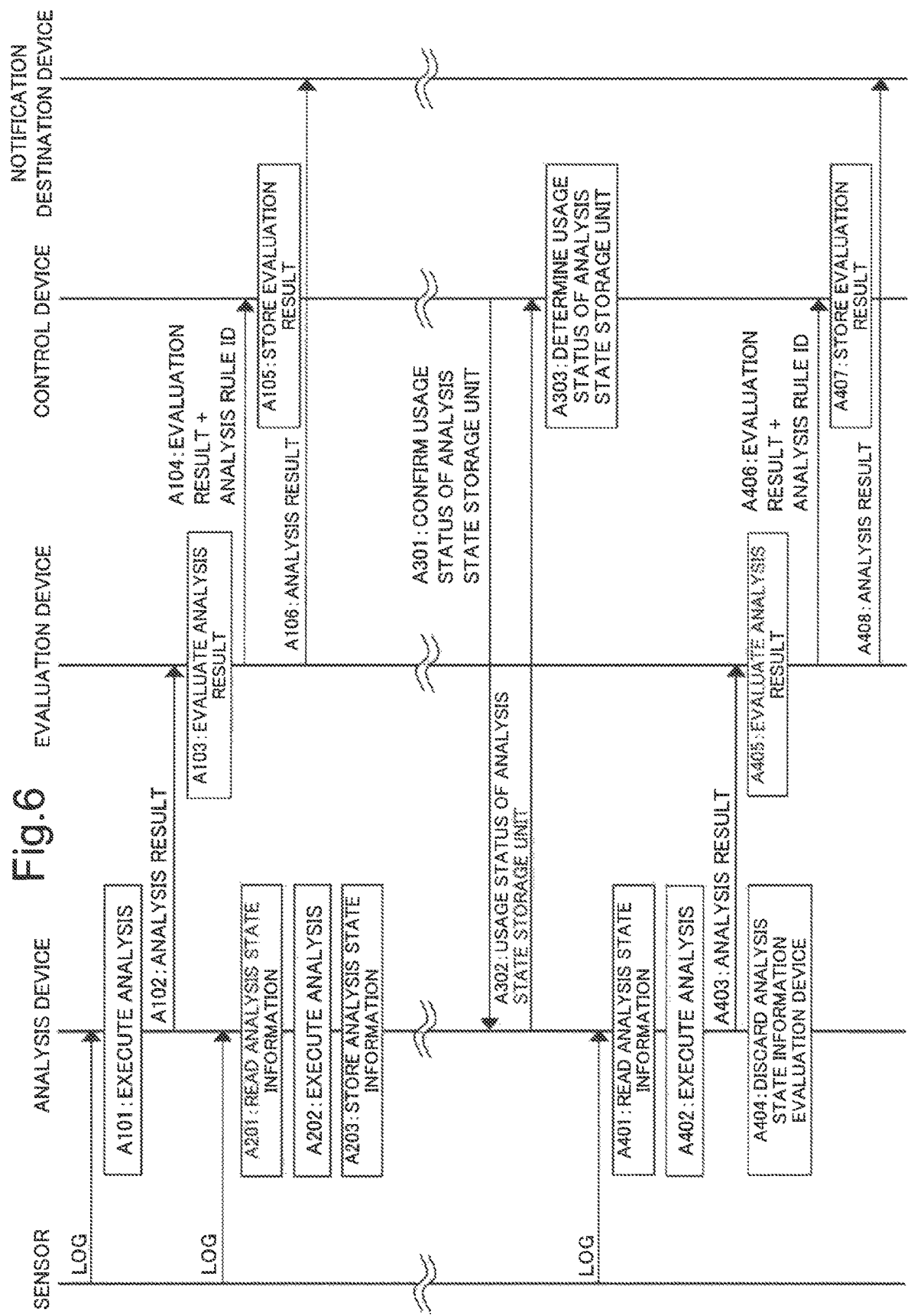
FIG. 6 is a sequence diagram describing an operation of the information processing system in the first example embodiment according to the present invention, in a steady state.

In the following, example embodiments according to the present invention are described. Each example embodiment is an example, and the present invention is not limited to each example embodiment.

First Example Embodiment

A first example embodiment according to the present invention is described in detail with reference to the drawings. FIG. 1 is a functional block diagram illustrating a configuration of an information processing system 1 in the first example embodiment according to the present invention. Referring to FIG. 1, the information processing system 1 includes an analysis device 10 and a control device 11. The analysis device 10 and the control device 11 are communicably connected. Further, the analysis device 10 is communicably connected to sensors 5 and an evaluation device 7. The control device 11 is communicably connected to the evaluation device 7. The evaluation device 7 is communicably connected to a notification destination device 9. In FIG. 1, each one of the analysis device 10 and the control device 11 is illustrated. However, the number of each device included in the information processing system 1 is not limited. Further, in FIG. 1, three sensors 5, and each one of the evaluation device 7 and the notification destination device 9 are illustrated. However, the number of each device to be connected to the information processing system 1 is not limited.

The analysis device 10 includes an analysis execution unit 101, an analysis rule storage unit 102, an analysis state storage unit 103, and an analysis rule management unit 104. Further, the control device 11 includes an analysis state monitoring unit 111, an evaluation result storage unit 112, an evaluation result management unit 113, and an analysis rule control unit 114.

Herein, each device constituting the information processing system 1 is configurable by hardware elements as illustrated in FIG. 2. In FIG. 2, the analysis device 10 includes a central processing unit (CPU) 1001, a memory 1002, and a network interface 1005. Further, the control device 11 includes a CPU 1101, a memory 1102, and a network interface 1105. Each of the memories 1002 and 1102 is constituted of a random access memory (RAM), a read only memory (ROM), an auxiliary storage device (such as a hard disk), and the like. The network interfaces 1005 and 1105 are respectively interfaces to be connected to a network.

In this case, the analysis execution unit 101 and the analysis rule management unit 104 of the analysis device 10 are constituted of the network interface 1005, and the CPU 1001 for reading and executing a computer program stored in the memory 1002. Further, the analysis rule storage unit 102 and the analysis state storage unit 103 are constituted of the memory 1002. The analysis state monitoring unit 111, the evaluation result management unit 113, and the analysis rule control unit 114 of the control device 11 are constituted of the network interface 1105, and the CPU 1101 for reading and executing a computer program stored in the memory 1102. The evaluation result storage unit 112 is constituted of the memory 1102. Note that a hardware configuration of each device constituting the information processing system 1 and each functional block thereof is not limited to the above-described configuration.

Next, details of each functional block of the analysis device 10 are described.

The analysis execution unit 101 executes analysis based on an analysis rule stored in the analysis rule storage unit 102, with respect to data to be input as an object of analysis, and outputs an analysis result. Herein, analysis based on an analysis rule is processing of determining whether an analysis rule is satisfied by using data to be input, and outputting, as an analysis result, information indicating that the analysis rule is satisfied when the analysis rule is satisfied. Data to be input may be information to be received from the sensor 5, for example.

Further, the analysis execution unit 101 executes analysis by referring to analysis state information stored in the analysis state storage unit 103, during analysis based on an analysis rule. However, there may be analysis in which reference of analysis state information is not necessary, depending on an analysis rule. Furthermore, when the analysis execution unit 101 detects information, which may be referred to in on-going analysis or another analysis, during analysis based on an analysis rule, the analysis execution unit 101 stores the information in the analysis state storage unit 103, as analysis state information. Details of analysis state information will be described later.

Further, the analysis execution unit 101 outputs an analysis result as necessary when analysis based on an analysis rule is executed. An output destination is the evaluation device 7. For example, when an event that satisfies an analysis rule is detected, the analysis execution unit 101 may output, as an analysis result, information relating to detection of an event that satisfies an analysis rule, together with information for uniquely identifying the analysis rule. An analysis result includes information to be used when the analysis result is evaluated by the evaluation device 7 to be described later.

Further, for example, when information indicating validity of an analysis rule is included in the analysis rule, the analysis execution unit 101 may execute analysis in accordance with the information indicating the validity. Hereinafter, an analysis rule including information indicating validity of the analysis rule is also referred to as a valid analysis rule. Further, an analysis rule including information indicating that the analysis rule is not valid (in other words, invalid) is also referred to as an invalid analysis rule. In this case, specifically, regarding a valid analysis rule, the analysis execution unit 101 executes analysis based on the analysis rule, and regarding an invalid analysis rule, the analysis execution unit 101 does not execute analysis based on the analysis rule.

The analysis rule storage unit 102 stores an analysis rule. An analysis rule indicates a rule which is determinable by using data to be input. For example, an analysis rule may be information which specifies output of detection as an analysis result, when it is detected that data which satisfies a predetermined condition is input a designated number of times or more during a predetermined period. Note that an analysis rule may include a condition with respect to most recently input data, or may include a condition with respect to data that have been input until then or a statistical processing result on the data.

Further, for example, as described above, an analysis rule may include information indicating validity. Validity indicates whether analysis based on the analysis rule becomes an object to be executed by the analysis execution unit 101. Hereinafter, whether analysis becomes an object to be executed is also described as whether analysis is executable. In this case, an example of information to be stored in the analysis rule storage unit 102 is illustrated in FIG. 3. FIG. 3 illustrates a table in which each entry indicating an analysis rule is stored. Each entry includes pieces of information respectively indicating an ID for uniquely identifying an analysis rule, an analysis rule, and validity of an analysis rule (valid or invalid). Hereinafter, an analysis rule, which is indicated by an entry whose ID is 1, is also referred to as an analysis rule ID(1). For example, an uppermost entry in FIG. 3 defines the analysis rule ID(1) which outputs an analysis result, when the following condition is satisfied. The condition is a condition such that data in which a customer ID is 1 (Customer ID=1) and a signature ID is 32 (Signature ID=32) are observed five times or more (Count>=5) during ten minutes (10 Minutes). Further, the entry indicates that the analysis rule ID(1) becomes an object to be executed (valid) by the analysis execution unit 101. In this way, the analysis rule storage unit 102 is able to store one or more entries including an analysis rule, which becomes an object to be executed by the analysis execution unit 101.

The analysis state storage unit 103 stores analysis state information. Analysis state information is information indicating a state of analysis to be generated or referred by the analysis execution unit 101. In other words, analysis state information to be generated is information indicating a state of currently on-going analysis, and may be used in on-going analysis or another analysis. Note that another analysis may be analysis which is executed in the future, based on an analysis rule to be applied to currently on-going analysis. Alternatively, another analysis may be analysis which is executed in the future, based on an analysis rule different from an analysis rule to be applied to currently on-going analysis.

For example, analysis state information may be data, which may be referred to in currently on-going analysis or another analysis, in order to determine whether an analysis rule is satisfied. Further, data, which may be referred to in currently on-going analysis or another analysis, may be data themselves which become an object of currently on-going analysis or analysis in the past, or may be information such that the data are processed.

In this case, an example of information to be stored in the analysis state storage unit 103 is illustrated in FIG. 4. FIG. 4 illustrates a table in which each entry indicating analysis state information is stored. In this example, each entry includes pieces of information respectively indicating an analysis rule ID and analysis state information. An analysis rule ID is information for uniquely identifying an analysis rule, and is associated with an ID in the analysis rule storage unit 102 illustrated in FIG. 3. For example, an uppermost entry in FIG. 4 indicates analysis state information to be used, when analysis based on the analysis rule ID(1) is executed. That is, as the analysis state information, information indicating that data being a part of a condition of the analysis rule ID(1) and satisfying that a customer ID is 1 (Customer ID=1) and a signature ID is 32 (Signature ID=32) are detected one time each (Count=1) is stored at respective points of time (Detected At) 1453448586.923002638, 1453448628.885667185, 1453448639.857580021, and 1453448653.592506500.

Further, when analysis based on the analysis rule ID(1) is executed, analysis state information associated with the analysis rule ID(1) in FIG. 4 is referred by the analysis execution unit 101. In other words, this analysis state information is referred to in determining whether all conditions of the analysis rule ID(1) are satisfied. When analysis state information associated with the analysis rule ID(1) satisfies all conditions of the analysis rule ID(1), an analysis result is output by the analysis execution unit 101.

The analysis rule management unit 104 manages an analysis rule stored in the analysis rule storage unit 102. Specifically, the analysis rule management unit 104 is connected to the control device 11, and executes addition, deletion, and change of an analysis rule, based on control by the control device 11. For example, it is assumed that the information illustrated in FIG. 3 is stored in the analysis rule storage unit 102. In this case, the analysis rule management unit 104 changes information indicating validity of an analysis rule (analysis rule is executable or not), indicated by an entry designated by the control device 11, from valid to invalid, or from invalid to valid. Hereinafter, changing information indicating validity of an analysis rule from valid to invalid is also described as invalidating an analysis rule. Further, changing information indicating validity of an analysis rule from invalid to valid is also described as validating an analysis rule.

Next, each functional block of the control device 11 is described.

The analysis state monitoring unit 111 is connected to the analysis state storage unit 103 of the analysis device 10, and monitors a usage status of the analysis state storage unit 103. A usage status may be, for example, a capacity or a number of pieces of analysis state information to be stored in the analysis state storage unit 103, a free storage capacity, a content of analysis state information, and the like. A monitoring result is notified to the analysis rule control unit 114 to be described later. For example, it is assumed that the information illustrated in FIG. 4 is stored in the analysis state storage unit 103. In this case, the analysis state monitoring unit 111 may acquire, as a usage status, a number of entries in a table, a usable storage capacity, a free storage capacity, and a content of each entry, based on an instruction of the analysis rule control unit 114, and may notify the analysis rule control unit 114 of an acquired value.

The evaluation result storage unit 112 stores an evaluation result with respect to an analysis result output from the analysis execution unit 101 of the analysis device 10. An evaluation result with respect to an analysis result may be information indicating certainty of an analysis result. Note that an evaluation result may be information generated by the evaluation device 7, or may be information input to the evaluation device 7.

FIG. 5 is a diagram illustrating an example of information to be stored in the evaluation result storage unit 112. FIG. 5 illustrates a table in which each entry indicating an evaluation result is stored. In the example of FIG. 5, each entry includes pieces of information respectively indicating an evaluation completion time, an analysis rule ID, and an evaluation result. An evaluation completion time indicates a point of time when an evaluation result with respect to an associated analysis result is generated or acquired. Further, an analysis rule ID indicates an ID of an analysis rule applied when an associated analysis result is output. Furthermore, an evaluation result indicates an evaluation result with respect to an associated analysis result. For example, an uppermost entry in FIG. 5 indicates that an evaluation result, being false positive with respect to an analysis result output by analysis based on an analysis rule ID(3), is generated or acquired at a point of time of 2016/01/22 17:00.00. Note that, in this example, "false positive" indicates an evaluation that "an analysis result is incorrectly output". Further, "true positive" indicates an evaluation that "an analysis result is correctly output". In this way, the evaluation result storage unit 112 stores one or more entries including an evaluation result with respect to an analysis result output from the analysis execution unit 101 of the analysis device 10.

The evaluation result management unit 113 acquires, from the evaluation device 7, an evaluation result with respect to an analysis result output from the analysis execution unit 101 of the analysis device 10, and stores the evaluation result in the evaluation result storage unit 112. Further, the evaluation result management unit 113 acquires an entry included in a table of the evaluation result storage unit 112, based on control of the analysis rule control unit 114, and notifies the analysis rule control unit 114 of an acquired content.

The analysis rule control unit 114 refers to a usage status of the analysis state storage unit 103 of the analysis device 10, via the analysis state monitoring unit 111. Further, the analysis rule control unit 114 refers to information stored in the evaluation result storage unit 112, via the evaluation result management unit 113. Furthermore, the analysis rule control unit 114 controls an analysis rule stored in the analysis rule storage unit 102 of the analysis device 10, based on both pieces of information. Control of an analysis rule is executed via the analysis rule management unit 104. More specifically, the analysis rule control unit 114 controls information indicating validity of an analysis rule selected based on an evaluation result, when a usage status of the analysis state storage unit 103 satisfies a predetermined condition. By this control, the analysis rule control unit 114 controls whether analysis based on the analysis rule is to be executed by the analysis execution unit 101 of the analysis device 10.

For example, it is assumed that the information illustrated in FIG. 3 is stored in the analysis rule storage unit 102. In this case, the analysis rule control unit 114 identifies an analysis rule ID, based on lowness of an evaluation result, when a free storage capacity being a usage status of the analysis state storage unit 103 falls below a predefined threshold value. Lowness of an evaluation result may be highness of a false positive rate.

Specifically, the analysis state storage unit 103 may identify an analysis rule ID (e.g. ID=3) in which a false positive rate is equal to or higher than a threshold value. Further, the analysis rule control unit 114 instructs the analysis rule management unit 104 of the analysis device 10, in such a way as to invalidate an analysis rule of an identified analysis rule ID. Thus, the analysis rule management unit 104 searches an entry of an instructed analysis rule ID (e.g. ID=3), in the analysis rule storage unit 102, and changes information indicating validity of an associated entry from valid to invalid. Execution of analysis based on an invalidated analysis rule ID is stopped. Consequently, there is no likelihood that analysis state information is newly stored for an analysis rule in which a false positive rate is high (effect to be acquired by analysis is low), and storing analysis state information, which may cause an excess in capacity of the analysis state storage unit 103, is suppressed. Consequently, the analysis execution unit 101 is able to continue execution of an analysis rule in which a true positive rate is relatively high (effect to be acquired by analysis is high), as compared to an invalidated analysis rule. If control of an analysis rule as described above is not executed, an excess in capacity of the analysis state storage unit 103 may occur, storing new analysis state information may become impossible, and execution of all analyses may be stopped. The analysis rule control unit 114 avoids stopping of execution of all analyses as described above.

Further, when an analysis rule is invalidated, the analysis rule management unit 104 may delete an entry stored in the analysis state storage unit 103, in association with an analysis rule ID to be invalidated. Deletion of an entry as described above may be executed by the analysis execution unit 101, under an instruction from the analysis rule management unit 104. Thus, storing analysis state information that is not used for analysis is further suppressed, and a free storage capacity is increased in the analysis state storage unit 103. Consequently, continuation of execution of analysis by the analysis execution unit 101 is further improved.

Further, when a free storage capacity being a usage status of the analysis state storage unit 103 exceeds a predefined threshold value, the analysis rule control unit 114 identifies an analysis rule ID, based on highness of an evaluation result, from among analysis rules invalidated in the analysis rule storage unit 102. Highness of an evaluation result may be lowness of a false positive rate.

Specifically, the analysis state storage unit 103 may identify an analysis rule ID in which a false positive rate is lower than a threshold value, from among analysis rules invalidated in the analysis rule storage unit 102. Further, the analysis rule control unit 114 instructs the analysis rule management unit 104 of the analysis device 10, in such a way as to validate an identified analysis rule ID. Thus, the analysis rule management unit 104 searches an entry of an instructed analysis rule ID, in the analysis rule storage unit 102, and changes information indicating validity of an associated entry from invalid to valid. Execution of analysis based on a validated analysis rule ID is started. Consequently, it becomes possible to continue execution of analysis, based on an analysis rule in which a false positive rate is low (effect to be acquired by analysis is high).

Next, each device to be connected to the information processing system 1 is described.

The sensor 5 is connected to the analysis execution unit 101 of the analysis device 10. Further, the sensor 5 generates data being an object of analysis to be executed by the analysis execution unit 101. Note that, as described above, one or more sensors 5 are connected to the information processing system 1. For example, it is assumed that the information processing system 1 is a system for collecting security events from a network device, and executing analysis for detecting a security threat in a network or in an information system. In this case, as the sensor 5, a network device (such as a firewall device and a threat detection system called Intrusion Detection System) is applicable.

The evaluation device 7 is connected to the analysis execution unit 101 of the analysis device 10, and the evaluation result management unit 113 of the control device 11. Further, the evaluation device 7 generates or acquires an evaluation result with respect to an analysis result to be output from the analysis execution unit 101 of the analysis device 10. As described above, an evaluation result may be information indicating certainty of an analysis result. For example, the evaluation device 7 may execute processing of generating an evaluation result, based on an analysis result to be output from the analysis execution unit 101. Alternatively, the evaluation device 7 may output, to an output device, an analysis result to be output from the analysis execution unit 101, and acquire, as an evaluation result, information to be input from an input device and the like depending on an output. Further, the evaluation device 7 outputs, to the evaluation result management unit 113 of the control device 11, a generated or acquired evaluation result. In addition to the above, the evaluation device 7 outputs an analysis result to the notification destination device 9.

The notification destination device 9 is connected to the evaluation device 7. The notification destination device 9 is a device which uses an analysis result to be output from the analysis execution unit 101 of the analysis device 10. The notification destination device 9 may execute processing using an analysis result. Alternatively, the notification destination device 9 may output an analysis result to an output device and the like. An analysis result output to an output device and the like is usable by an operator of the sensor 5, an operator of the information processing system 1, or the like.

Note that, in FIG. 1, the analysis device 10 and the control device 11 are exemplified as different devices. The example embodiment is not limited to the above. The analysis device 10 and the control device 11 may be configured as an integral device. Further, the analysis device 10, the control device 11, or a device such that the analysis device 10 and the control device 11 are integrated may include the evaluation device 7.

Next, an operation of the present example embodiment is described in detail with reference to the drawings.

First of all, an operation of the first example embodiment according to the present invention in a steady state is illustrated in a sequence diagram of FIG. 6. Note that, in the following description on an operation, data being an object of analysis are also referred to as a log.

In FIG. 6, steps from step A101 to step A106 indicate an example of an operation of each device, when analysis, in which reference of an analysis state is not necessary, based on an analysis rule is executed.

First of all, when a log is received from the group of sensors 5, the analysis execution unit 101 of the analysis device 10 executes analysis, in which reference of an analysis state is not necessary, based on an analysis rule (Step A101).

Next, the analysis execution unit 101 transmits an analysis result to the evaluation device 7 (Step A102).

Next, the evaluation device 7 generates or acquires an evaluation result with respect to the received analysis result (Step A103).

Next, the evaluation device 7 transmits, to the control device 11, an analysis rule ID for uniquely identifying an analysis rule applied when the analysis result is output, and an evaluation result with respect to the analysis result, in association with each other (Step A104).

Next, the evaluation result management unit 113 of the control device 11 stores, in the evaluation result storage unit 112, the received evaluation result and the analysis rule ID in association with each other (Step A105).

Next, the evaluation device 7 notifies the notification destination device 9 of the analysis result (Step A106). Note that an operation of Step A106 may be executed after Step A102, and may not be necessarily executed after Steps A103 and A104.

Further, in FIG. 6, Steps A201 to A203 indicate an example of an operation of each device, when analysis, in which reference of an analysis state is necessary, based on an analysis rule is executed, but an analysis result is not output.

In this case, first of all, when a log is received from the group of sensors 5, the analysis execution unit 101 of the analysis device 10 reads analysis state information, in order to execute analysis in which reference of an analysis state is necessary (Step A201).

Next, the analysis execution unit 101 executes analysis (Step A202).

Next, when detecting data usable in on-going analysis or another analysis, the analysis execution unit 101 stores, in the analysis state storage unit 103, information relating to the data, as analysis state information (Step A203).

Note that, herein, it is assumed that an analysis rule is determined not to be satisfied, based on currently detected analysis state information and read analysis state information. Therefore, the analysis execution unit 101 does not output an analysis result.

Further, in FIG. 6, steps from step A301 to step A303 indicate an operation of monitoring a usage status of the analysis state storage unit 103. This operation is executed at each predetermined timing.

In Step A301, the analysis state monitoring unit 111 of the control device 11 transmits, to the analysis device 10, information confirming a usage status of the analysis state storage unit 103 of the analysis device 10 (Step A301).

Next, the analysis device 10 transmits information indicating a usage status of the analysis state storage unit 103 (Step A302).

Next, the analysis rule control unit 114 of the control device 11 determines whether a usage status satisfies a predetermined depletion condition (Step A303). For example, a predetermined depletion condition may be such that a free storage capacity as a usage status falls below a predefined threshold value. Herein, it is assumed that a usage status does not satisfy a predetermined depletion condition. In this case, the analysis rule control unit 114 does not execute control of an analysis rule.

Further, in FIG. 6, steps from step A401 to step A408 indicate an example of an operation of each device, when an analysis rule in which reference of an analysis state is necessary is executed, and an analysis result is output.

In this case, first of all, when a log is received from the group of sensors 5, the analysis execution unit 101 of the analysis device 10 reads analysis state information, in order to execute analysis in which reference of an analysis state is necessary (Step A401).

Next, the analysis execution unit 101 executes analysis (Step A402).

Next, when detecting data usable in on-going analysis or another analysis, it is assumed that the analysis execution unit 101 determines that all conditions of an analysis rule are satisfied, based on information relating to the data, and read analysis state information. In this case, the analysis execution unit 101 outputs an analysis result to the evaluation device 7 (Step A403).

For example, an analysis result may include an analysis rule ID, and information to be used when the evaluation device 7 determines whether the analysis result is true positive or false positive. Information to be used in determination may be, for example, a log which is input when analyses in Steps A202 or A402 is executed.

Note that, at this occasion, the analysis execution unit 101 may discard analysis state information, which is not expected to be used in the future, from the analysis state storage unit 103 (Step A404). Note that an operation of Step A404 may be executed after Step A402, and may not be necessarily executed after Step A403.

Next, the control device 11 and the evaluation device 7 execute Steps A405 to A408. Since operations of Steps A405 to A408 are similar to those of Steps A103 to A106 described above, description thereof is omitted. Thus, an evaluation result with respect to an analysis result output in Step A403 is stored in the evaluation result storage unit 112.

Note that, in FIG. 6, Steps A101 to A106 are executed in the above-described order, Steps A201 to A203 are executed in the above-described order, Steps A301 to A303 are executed in the above-described order, and Steps A401 to A408 are executed in the above-described order. However, an order of execution other than the above in steps illustrated in FIG. 6 is not limited to the illustrated order.

Figure 7:
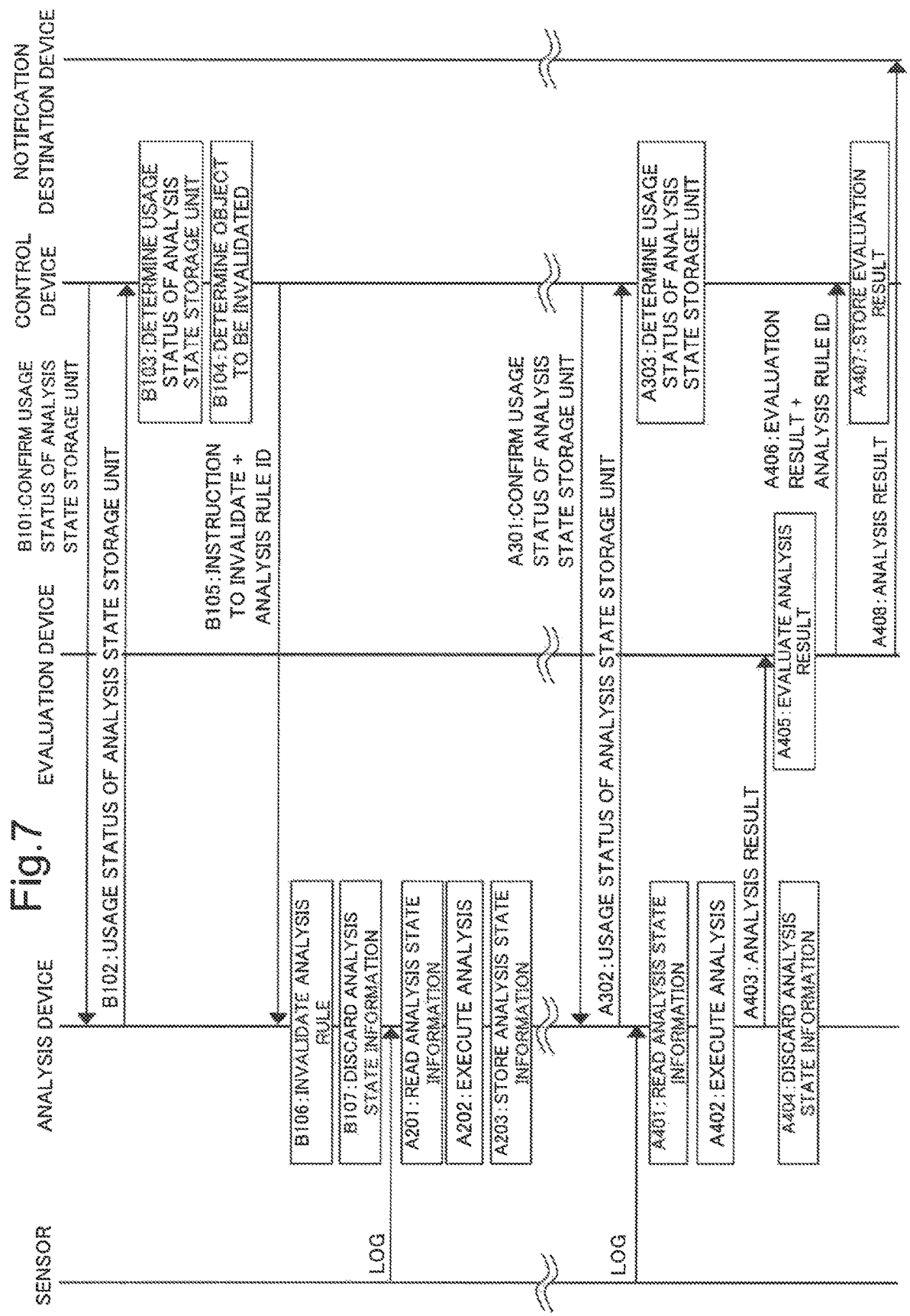
FIG. 7 is a sequence diagram describing an operation of the information processing system in the first example embodiment according to the present invention, in a resource depletion state.

Next, an operation of the first example embodiment according to the present invention in a resource depletion state is illustrated in a sequence diagram of FIG. 7. Herein, it is assumed that a resource depletion state is a state in which a resource is being depleted in the analysis state storage unit 103 of the analysis device 10.

In FIG. 7, Steps B101 to B107 indicate an operation of controlling an analysis rule, when a usage status of the analysis state storage unit 103 satisfies a predetermined depletion condition.

In this case, first of all, the control device 11 and the analysis device 10 execute Steps B101 to B103. Since operations of Steps B101 to B103 are similar to those of Steps A301 to A303 in a steady state described with reference to FIG. 6, description thereof is omitted. Thus, the analysis rule control unit 114 of the control device 11 acquires a determination result as to whether a usage status of the analysis state storage unit 103 of the analysis device 10 satisfies a predetermined depletion condition. Herein, it is assumed that a usage status satisfies a predetermined depletion condition.

In view of the above, the analysis rule control unit 114 determines an analysis rule being an object to be invalidated, based on lowness of an evaluation result stored in the evaluation result storage unit 112 (Step B104).

Next, the analysis rule control unit 114 transmits, to the analysis device 10, information indicating an instruction to invalidate, and an analysis rule ID for uniquely identifying an analysis rule being an object to be invalidated, as a pair (Step B105).

Next, when receiving information indicating an instruction to invalidate and an analysis rule ID, the analysis rule management unit 104 of the analysis device 10 invalidates an analysis rule of the received analysis rule ID in the analysis rule storage unit 102 (Step B106).

Further, the analysis execution unit 101 discards analysis state information, associated with the received analysis rule ID, from the analysis state storage unit 103 (Step B107).

By executing Steps B106 to B107, thereafter, analysis based on an invalidated analysis rule ID is not executed by the analysis execution unit 101. Consequently, there is no likelihood that analysis state information is newly stored in the analysis state storage unit 103 by analysis based on an invalidated analysis rule ID. That is, the analysis device 10 is able to avoid that continuation of analysis becomes disabled due to a usage status of the analysis state storage unit 103. Specifically, the analysis device 10 is able to avoid depletion of a free storage capacity of the analysis state storage unit 103.

Thus, for example, subsequently, as illustrated in FIG. 7, it becomes possible to continue operations of Steps A201 to A203 where analysis, in which reference of an analysis state is necessary, is executed, but an analysis result is not output. Since operations of Steps A201 to A203 are similar to those in FIG. 6, description thereof is omitted.

Note that, at this occasion, a usage status of the analysis state storage unit 103 is such that new analysis state information is storable by operations of Steps B106 to B107. Therefore, in Step A203, analysis state information is newly stored in the analysis state storage unit 103 of the analysis device 10, and analysis is continued.

Subsequently, as illustrated in FIG. 7, it is assumed that operations of Steps A301 to A303, where a usage status of the analysis state storage unit 103 is monitored, are executed at a predetermined timing. Since operations of Steps A301 to A303 are similar to those in FIG. 6, description thereof is omitted. Herein, it is assumed that a usage status does not satisfy a predetermined depletion condition, because analysis state information is discarded in Step B107. Therefore, the analysis rule control unit 114 does not execute control of an analysis rule.

Further, subsequently, as illustrated in FIG. 7, it is possible to continue operations of Steps A401 to A408 where analysis, in which reference of an analysis state is necessary, is executed, and an analysis result is output. Since operations of Steps A401 to A408 are similar to those in FIG. 6, description thereof is omitted.

Note that, in FIG. 7, Steps B101 to B107 are executed in the above-described order, Steps A201 to A203 are executed in the above-described order, Steps A301 to A303 are executed in the above-described order, and Steps A401 to A408 are executed in the above-described order. However, an order of execution other than the above in steps illustrated in FIG. 7 is not limited to the illustrated order.

Figure 8:
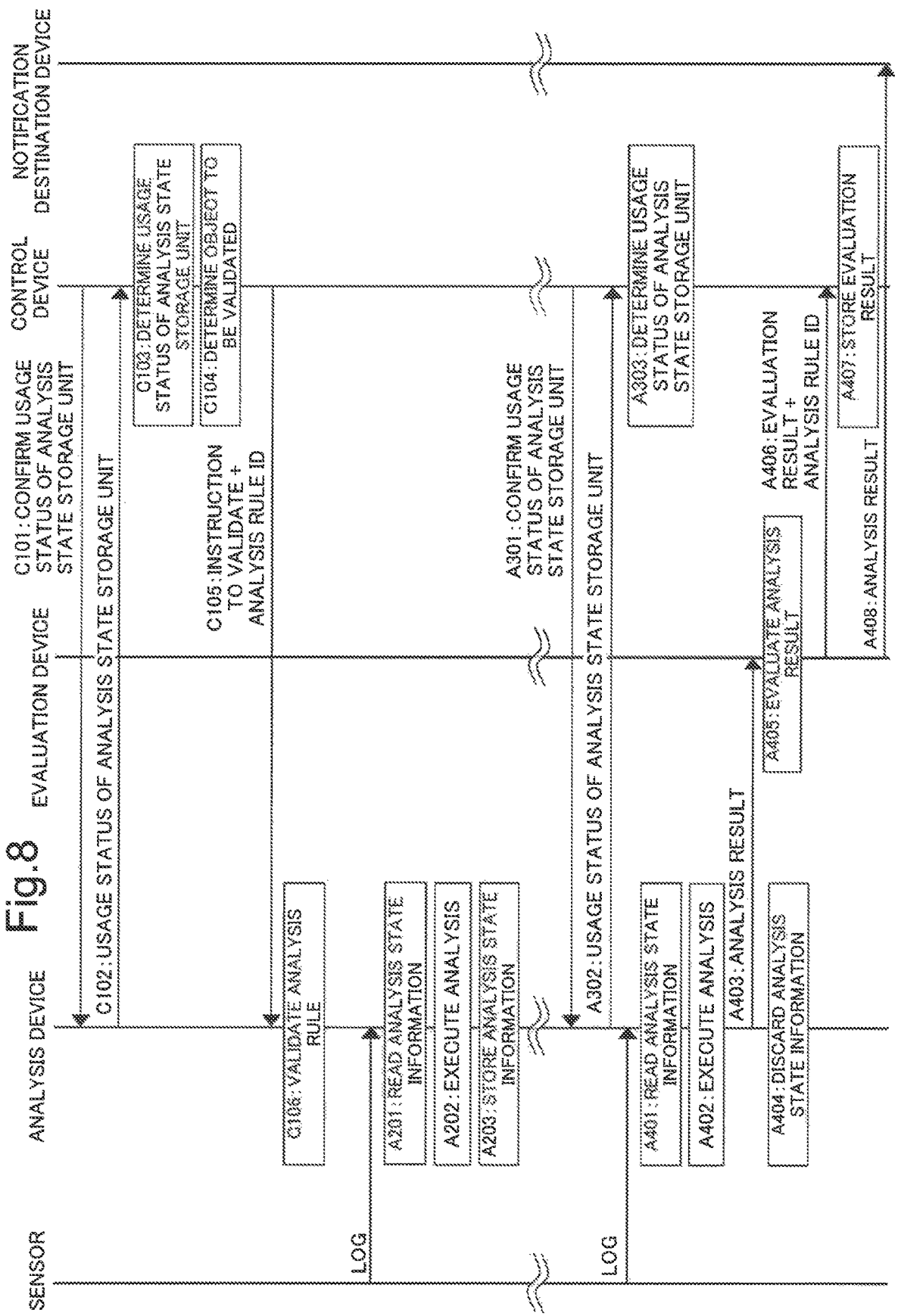
FIG. 8 is a sequence diagram describing an operation of the information processing system in the first example embodiment according to the present invention, in a resource surplus state.

Next, an operation of the first example embodiment according to the present invention in a resource surplus state is illustrated in a sequence diagram of FIG. 8. Herein, it is assumed that a resource surplus state is a state in which a resource surpluses in the analysis state storage unit 103 of the analysis device 10.

In FIG. 8, Steps C101 to C106 indicate an operation of controlling an analysis rule, when a usage status of the analysis state storage unit 103 satisfies a predetermined surplus condition.

In this case, first of all, the control device 11 and the analysis device 10 execute Steps C101 to C102. Since operations of Steps C101 to C102 are similar to those of Steps A301 to A302 in a steady state described with reference to FIG. 6, description thereof is omitted. Thus, the analysis rule control unit 114 of the control device 11 acquires a usage status of the analysis state storage unit 103 of the analysis device 10.

Next, the analysis state monitoring unit 111 of the control device 11 determines whether a usage status of the analysis state storage unit 103 satisfies a predetermined surplus condition (Step C103). For example, a predetermined surplus condition may be such that a free storage capacity as a usage status exceeds a threshold value determined as a surplus condition. Note that determination as to whether a usage status of the analysis state storage unit 103 satisfies a predetermined surplus condition may be executed after it is determined that a usage status of the analysis state storage unit 103 does not satisfy the above-described predetermined depletion condition. Herein, it is assumed that a usage status of the analysis state storage unit 103 satisfies a surplus condition.

In view of the above, the analysis rule control unit 114 determines an analysis rule being an object to be validated, from a set of analysis rules invalidated in the analysis rule storage unit 102, based on highness of an evaluation result stored in the evaluation result storage unit 112 (Step C104).

Next, the analysis rule control unit 114 transmits, to the analysis device 10, information indicating an instruction to validate, and an analysis rule ID for uniquely identifying an analysis rule being an object to be validated, as a pair (Step C105).

Next, when receiving information indicating an instruction to validate and an analysis rule ID is received, the analysis rule management unit 104 of the analysis device 10 validates an analysis rule of the received analysis rule ID in the analysis rule storage unit 102 (Step C106).

By executing Step C106, thereafter, analysis based on a validated analysis rule of an analysis rule ID is started by the analysis execution unit 101.

For example, subsequently, it is assumed that operations of Steps A201 to A203 where analysis, in which reference of an analysis state is necessary, is executed, but an analysis result is not output, are executed, as analysis based on a validated analysis rule of an analysis rule ID. Since operations of Steps A201 to A203 are similar to those in FIG. 6, description thereof is omitted.

Subsequently, as illustrated in FIG. 8, it is assumed that Steps A301 to A303, where a usage status of the analysis state storage unit 103 is monitored, are executed at a predetermined timing. Since operations of Steps A301 to A303 are similar to those in FIG. 6, description thereof is omitted. Herein, it is assumed that a usage status does not satisfy a predetermined surplus condition. Therefore, the analysis rule control unit 114 does not execute control of an analysis rule.

Further, subsequently, as illustrated in FIG. 8, it is possible to continue operations of Steps A401 to A408 where analysis, in which reference of an analysis state is necessary, is executed, and an analysis result is output. Since operations of Steps A401 to A408 are similar to those in FIG. 6, description thereof is omitted.

Note that, in FIG. 8, Steps C101 to C106 are executed in the above-described order, Steps A201 to A203 are executed in the above-described order, Steps A301 to A303 are executed in the above-described order, and Steps A401 to A408 are executed in the above-described order. However, an order of execution other than the above in steps illustrated in FIG. 8 is not limited to the illustrated order.

Figure 9:
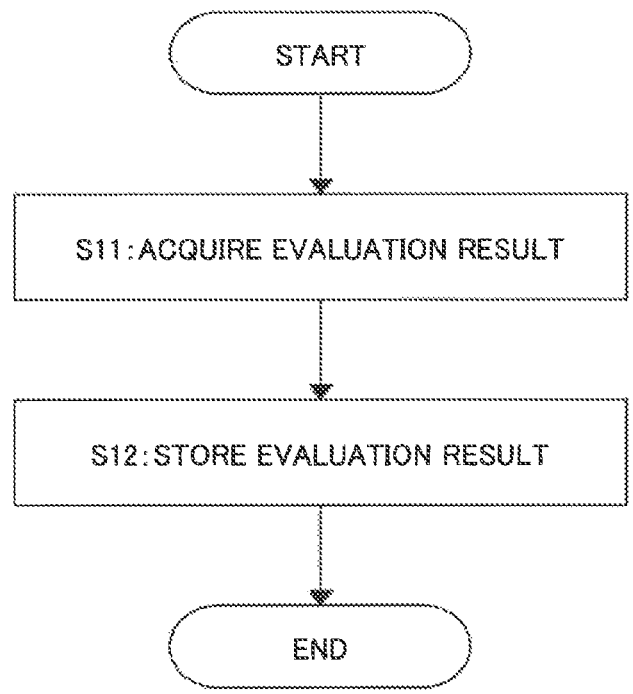
FIG. 9 is a flowchart describing an operation of acquiring and storing an evaluation result by a control device in the first example embodiment according to the present invention.

Next, details of an operation of acquiring an evaluation result by the control device 11 are illustrated in a flowchart of FIG. 9.

In FIG. 9, first of all, the evaluation result management unit 113 acquires an evaluation result from the evaluation device 7 (Step S11).

Next, the evaluation result management unit 113 stores the acquired evaluation result in the evaluation result storage unit 112 (Step S12).

The control device 11 finishes an operation of acquiring an evaluation result as described above.

Figure 10:
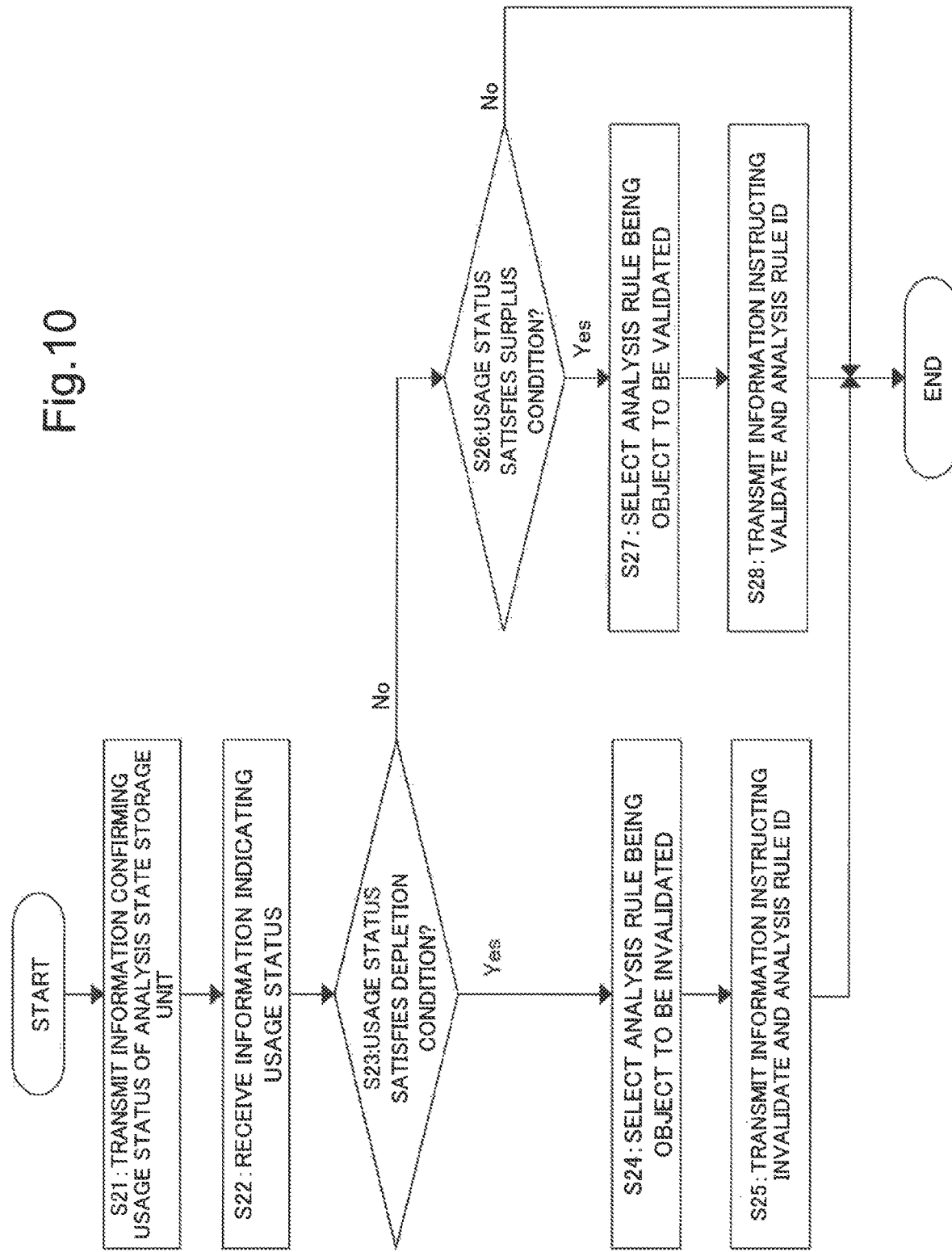
FIG. 10 is a flowchart describing an operation of monitoring the analysis state storage unit by the control device in the first example embodiment according to the present invention.

Next, details of an operation of monitoring a usage status of the analysis state storage unit 103, and controlling an analysis rule by the control device 11 are illustrated in a flowchart of FIG. 10.

In FIG. 10, first of all, the analysis state monitoring unit 111 transmits, to the analysis device 10, information confirming a usage status of the analysis state storage unit 103 (Step S21).

Next, the analysis state monitoring unit 111 receives, from the analysis device 10, information indicating a usage status of the analysis state storage unit 103 (Step S22).

Next, the analysis rule control unit 114 determines whether a usage status of the analysis state storing unit 103 satisfies a predetermined depletion condition (Step S23). As described above, a predetermined depletion condition may be such that a free capacity as a usage status falls below a predefined threshold value.

Herein, a case that a usage status of the analysis state storage unit 103 is determined to satisfy a predetermined depletion condition (Yes in Step S23) is described. In this case, the analysis rule control unit 114 selects an analysis rule being an object to be invalidated, based on lowness of an evaluation result stored in the evaluation result storage unit 112 (Step S24).

Further, the analysis rule control unit 114 transmits, to the analysis device 10, information instructing to invalidate, and an analysis rule ID for uniquely identifying an analysis rule being an object to be invalidated, as a pair (Step S25). Then, the control device 11 finishes the processing.

On the other hand, a case that a usage status of the analysis state storage unit 103 is determined not to satisfy a predetermined depletion condition (No in Step S23) is described. In this case, the analysis rule control unit 114 determines whether a usage status of the analysis state storage unit 103 satisfies a predetermined surplus condition (Step S26). For example, as described above, a predetermined surplus condition may be such that a free storage capacity as a usage status exceeds a threshold value determined as a surplus condition. Note that a threshold value determined as a surplus condition may be equal to a threshold value determined as a depletion condition. In this case, execution of Step S26 may be omitted. Alternatively, a threshold value determined as a surplus condition may be a threshold value different from and exceeding a threshold value determined as a depletion condition.

Herein, a case that a usage status of the analysis state storage unit 103 is determined to satisfy a surplus condition (Yes in Step S26) is described. In this case, the analysis rule control unit 114 selects an analysis rule being an object to be validated, from among analysis rules invalidated in the analysis rule storage unit 102, based on highness of an evaluation result stored in the evaluation result storage unit 112 (Step S27).

Further, the analysis rule control unit 114 transmits, to the analysis device 10, information instructing to validate, and an analysis rule ID for uniquely identifying an analysis rule being an object to be validated, as a pair (Step S28). Then, the control device 11 finishes the processing.

On the other hand, when a usage status of the analysis state storage unit 103 is determined not to satisfy a predetermined surplus condition (No in Step S26), the control device 11 finishes the processing.

Note that operations illustrated in FIG. 10 respectively associate with Steps A301 to A303, B101 to B105, B303, C101 to C105, and C303 in FIG. 6, FIG. 7, and FIG. 8. Further, operations illustrated in FIG. 10 are executed at each predetermined timing, as described with reference to FIG. 6, FIG. 7, and FIG. 8. Execution at each predetermined timing may be periodical execution, or may be repetitive execution based on a certain rule or a certain schedule.

Figure 11:
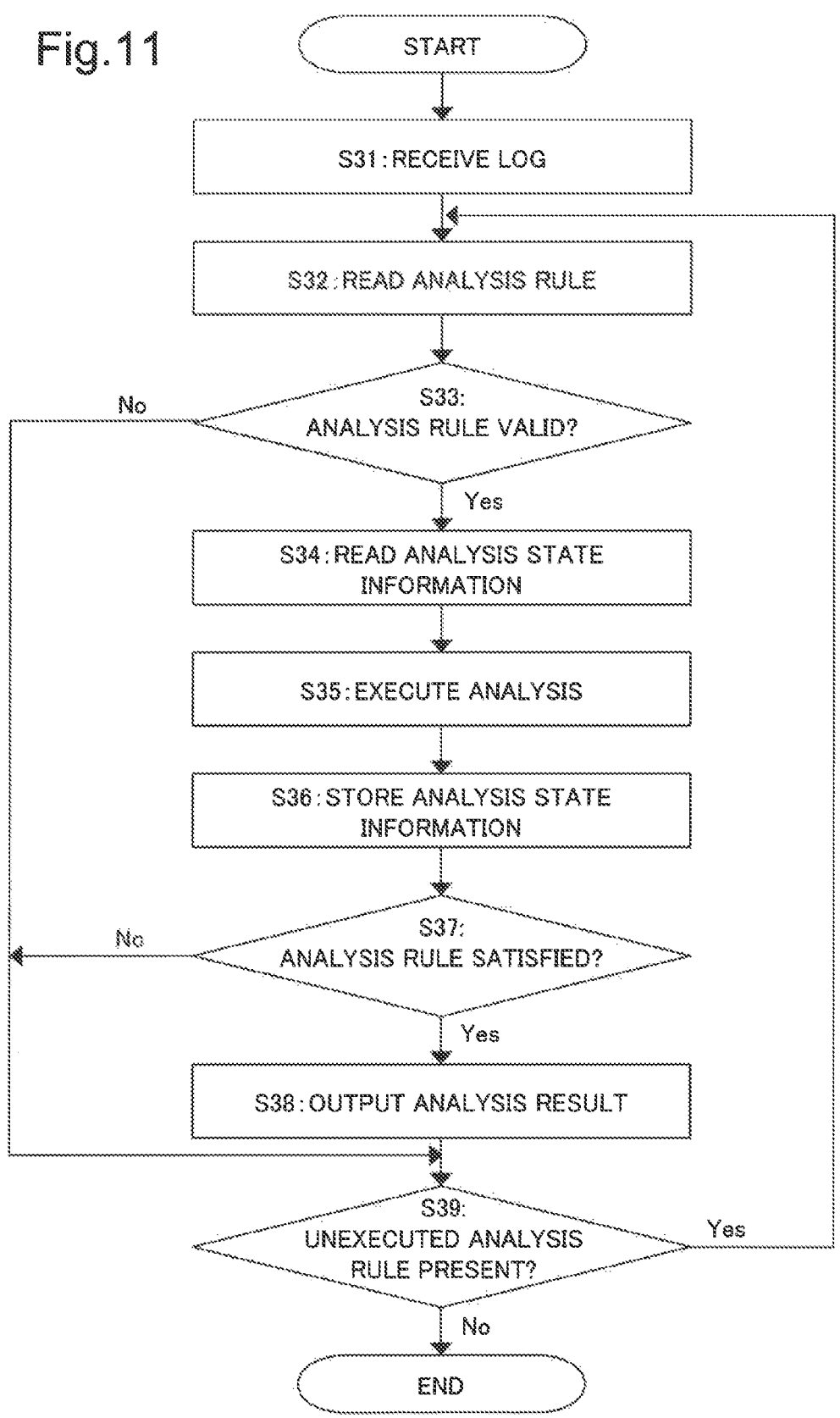
FIG. 11 is a flowchart describing an operation of executing analysis based on an analysis rule by an analysis device in the first example embodiment according to the present invention.

Next, details of an operation of executing analysis by the analysis device 10 are illustrated in a flowchart of FIG. 11.

In FIG. 11, first of all, the analysis execution unit 101 receives a log from the group of sensors 5 (Step S31).

Next, the analysis execution unit 101 reads one analysis rule from the analysis rule storage unit 102 (Step S32).

Next, the analysis execution unit 101 determines whether this analysis rule is valid (Step S33).

Herein, when it is determined that an analysis rule is valid (Yes in Step S33), the analysis execution unit 101 reads, from the analysis state storage unit 103, analysis state information necessary for execution of analysis (Step S34). Herein, analysis state information associated with a related analysis rule ID is read.

Next, the analysis execution unit 101 executes analysis (Step S35).

Next, when detecting a log to be used in an ongoing analysis or another analysis is detected during execution of analysis, the analysis execution unit 101 stores, in the analysis state storage unit 103, information relating to the log, as analysis state information (Step S36).

Next, the analysis execution unit 101 determines whether the analysis rule of the analysis rule ID is satisfied (Step S37). In this determination processing, analysis state information read in Step S34, and analysis state information stored in Step S36 are referred to.

Herein, when it is determined that the analysis rule is satisfied (Yes in Step S37), the analysis execution unit 101 outputs an analysis result to the evaluation device 7 (Step S38).

On the other hand, when it is determined that the analysis rule is not valid in Step S33 (No in Step S33), the analysis execution unit 101 determines whether an unexecuted analysis rule to be executed with respect to the received log is present (Step S39).

Further, in Step S37, also when it is determined that the analysis rule is not satisfied (No in Step S37), the analysis execution unit 101 executes Step S39.

Furthermore, in Step S38, after outputting an analysis result, the analysis execution unit 101 executes Step S39.

In Step S39, when it is determined that an unexecuted analysis rule to be executed with respect to the received log is present (Yes in Step S39), the analysis execution unit 101 repeatedly executes from Steps S32 to S39. The analysis device 10 reads a different unexecuted analysis rule, each time Step S32 is executed.

When an unexecuted analysis rule with respect to the received log is not present (No in Step S39), the analysis device 10 finishes the processing.

Figure 12:
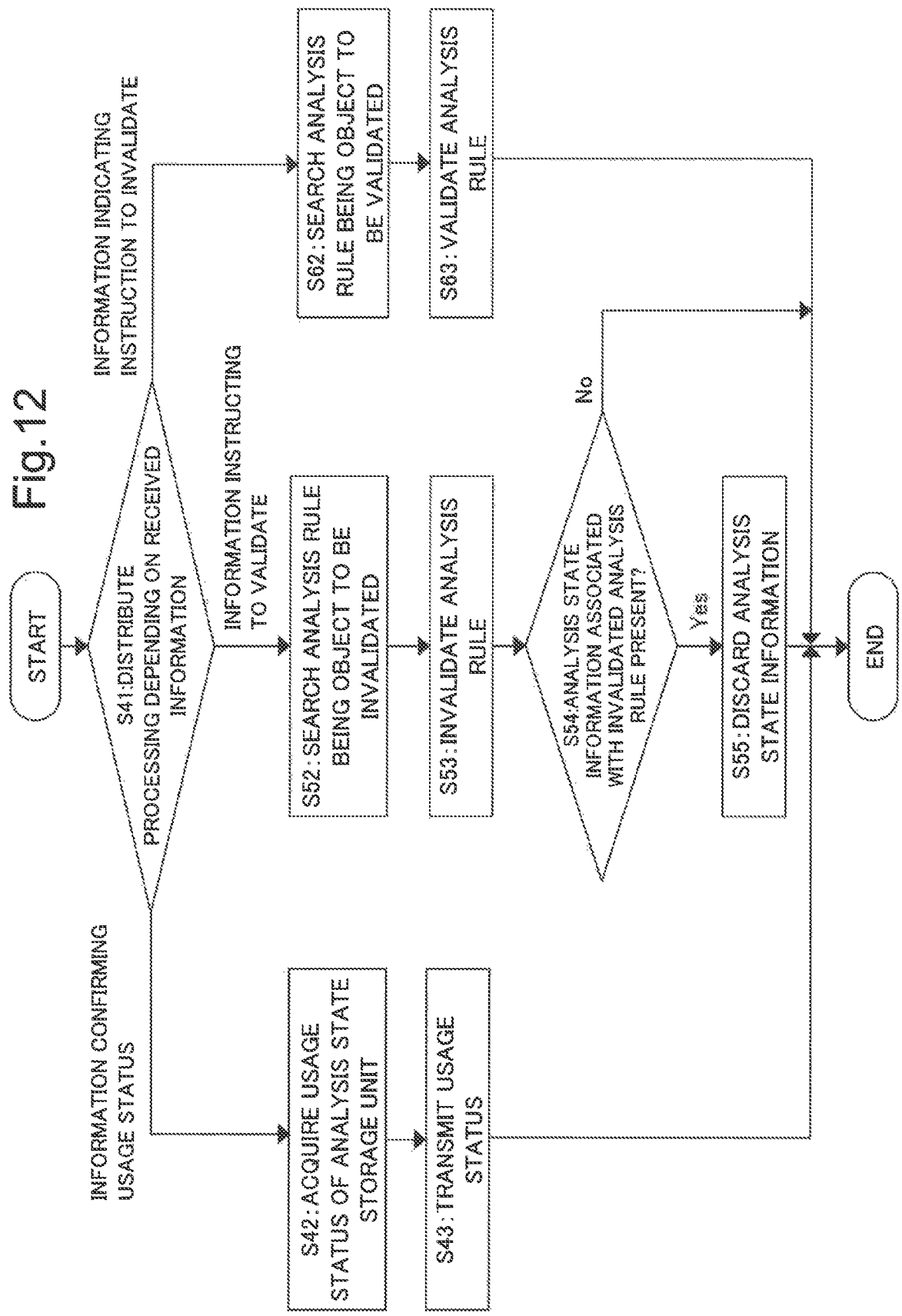
FIG. 12 is a flowchart describing an operation to be executed by the analysis device in the first example embodiment according to the present invention, under an instruction of the control device.

Next, details of an operation to be executed by the analysis device 10 based on an instruction of the control device 11 are illustrated in a flowchart of FIG. 12.

In FIG. 12, first of all, a case that the analysis device 10 receives information confirming a usage status of the analysis state storage unit 103 ("information confirming a usage status" in Step S41) is described. In this case, the analysis device 10 acquires information indicating a usage status of the analysis state storage unit 103 (Step S42).

Next, the analysis device 10 transmits information indicating a usage status to the control device 11 (Step S43), and finishes the processing.

Further, a case that the analysis device 10 receives information instructing to invalidate an analysis rule ("information instructing to invalidate" in Step S41) is described. In this case, the analysis rule management unit 104 searches, from the analysis rule storage unit 102, an analysis rule ID received together with information instructing to invalidate (Step S52).

Next, the analysis rule management unit 104 invalidates an analysis rule of the searched analysis rule ID (Step S53).

Next, the analysis rule management unit 104 determines whether analysis state information associated with the invalidated analysis rule ID is stored in the analysis state storage unit 103 (Step S54).

Herein, when it is determined that analysis state information associated with the invalidated analysis rule ID is stored (Yes in Step S54), the analysis rule management unit 104 discards the analysis state (Step S55), and finishes the processing.

On the other hand, when it is determined that analysis state information associated with the invalidated analysis rule ID is not stored (No in Step S54), the analysis device 10 finishes the processing.

Further, a case that the analysis device 10 receives information instructing to validate an analysis rule ("information instructing to validate" in Step S41) is described. In this case, the analysis rule management unit 104 searches, from the analysis rule storage unit 102, an analysis rule ID received together with information instructing to validate (Step S62).

Next, the analysis rule management unit 104 validates an analysis rule of the searched analysis rule ID (Step S63).

Description on an operation to be executed by the analysis device 10 under an instruction of the control device 11 finishes as described above.

Next, advantageous effects of the first example embodiment according to the present invention are described.

An information processing system according to the first example embodiment according in the present invention is able to more reliably continue execution of analysis, in an application where it is difficult to predict the amount or content of information to be input as an object of analysis.

A reason for this is described. In the present example embodiment, in an analysis device, an analysis execution unit executes an analysis rule and outputs an analysis result, based on an analysis rule. Further, an analysis rule storage unit stores information in a state that information indicating validity is included in an analysis rule. Furthermore, an analysis rule management unit manages an analysis rule in the analysis rule storage unit. Then, an analysis state storage unit stores analysis state information to be generated or referred to, when analysis by the analysis execution unit is executed. And, in a control device, an analysis state monitoring unit monitors a usage status of the analysis state storage unit. Moreover, an evaluation result management unit acquires an evaluation result with respect to an analysis result, and stores and manages the evaluation result in an evaluation result storage unit. Further, an analysis rule control unit selects an analysis rule, based on lowness of an evaluation result, when a usage status of the analysis state storage unit of the analysis device satisfies a predetermined depletion condition. Then, the analysis rule control unit controls to stop execution of analysis based on an analysis rule, by controlling the analysis rule via the analysis rule management unit of the analysis device in such a way as to invalidate a selected analysis rule. Further, the analysis rule control unit selects an analysis rule, based on highness of an evaluation result, from among analysis rules relating to analysis of which execution is stopped, when a usage status of the analysis state storage unit satisfies a predetermined surplus condition. Then, the analysis rule control unit controls to start execution of analysis based on an analysis rule, by controlling via the analysis rule management unit of the analysis device in such a way as to validate a selected analysis rule.

In this way, the present example embodiment suppresses storing analysis state information for an analysis rule in which an effect to be acquired by analysis is low (false positive rate is high), and consequently, suppresses storing analysis state information which may cause an excess in capacity of an analysis state storage unit for storing analysis state information. Thus, the present example embodiment is able to avoid a situation that it becomes impossible to store analysis state information necessary for analysis due to constraint of an analysis state storage unit for storing analysis state information, when the amount or content of information being an object of analysis is changed. Consequently, the present example embodiment is able to reliably continue execution of desired analysis, particularly, analysis in which an effect to be acquired by analysis is high.

In the foregoing, a configuration and operations of the first example embodiment according to the present invention are described. However, the first example embodiment may be modified. In the following, a second example embodiment according to the present invention including modifications is described.

Second Example Embodiment

The first example embodiment describes an example in which execution of desired analysis, particularly, analysis in which an effect to be acquired by analysis is high is continued by stopping analysis based on an analysis rule in which an effect to be acquired by analysis is low. The present embodiment describes an example in which execution of desired analysis is continued, without stopping analysis based on an analysis rule in which an effect to be acquired by analysis is low. Note that, in each drawing to be referred to in description of the present example embodiment, same configurations and steps to be operated similarly, as those in the first example embodiment according to the present invention, are indicated with same reference signs, and detailed description thereof in the present example embodiment is omitted.

Figure 13:
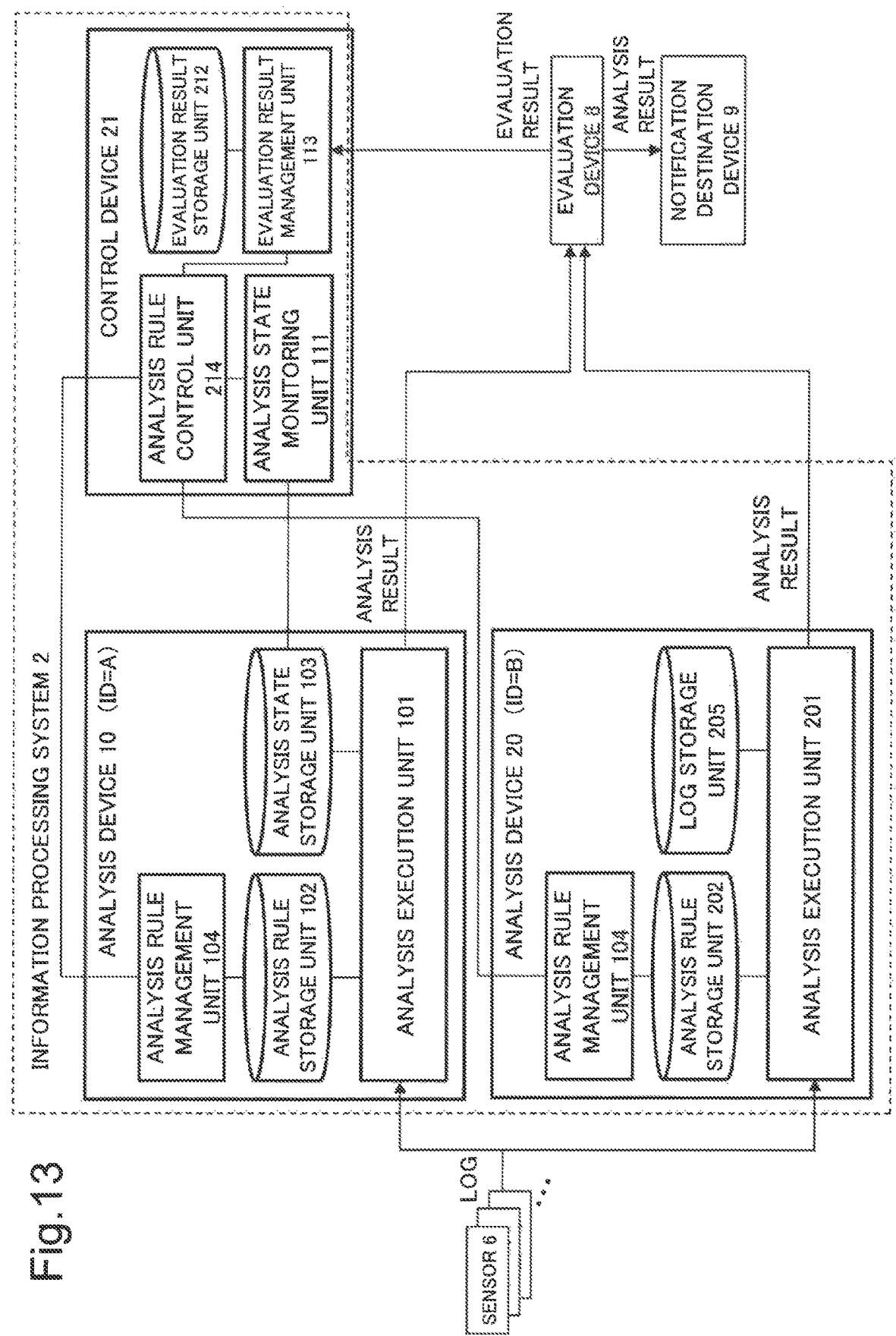
FIG. 13 is a block diagram illustrating a configuration of an information processing system in a second example embodiment according to the present invention.

The second example embodiment according to the present invention is described in detail with reference to the drawings. FIG. 13 is a functional block diagram illustrating a configuration of an information processing system 2 according to the second example embodiment in the present invention. Referring to FIG. 13, the information processing system 2 includes an analysis device 10, an analysis device 20, and a control device 21. Further, the analysis device 10 and the analysis device 20 are respectively connected to the control device 21. Furthermore, each of the analysis device 10 and the analysis device 20 is communicably connected to sensors 6 and an evaluation device 8. And, the control device 21 is communicably connected to the evaluation device 8. Then, the evaluation device 8 is communicably connected to a notification destination device 9. Note that in FIG. 13, each one of the analysis device 10, the analysis device 20, and the control device 21 is illustrated. The number of each device included in the information processing system 2, however, is not limited. Further, in FIG. 13, three sensors 6, and each one of the evaluation device 8 and the notification destination device 9 are illustrated. The number of each device to be connected to the information processing system 2, however, is not limited. In the following, differences with respect to the first example embodiment are mainly described.

First of all, the analysis device 10 is described.

A configuration and operations of the analysis device 10 are as described in the first example embodiment according to the present invention. Note that, as the analysis device 10, for example, it is possible to employ an analysis device in which an analysis delay is small, but a resource utilization efficiency with respect to analysis is low (e.g., a real-time-processing type analysis device), as compared to the analysis device 20 to be described later.

Next, the analysis device 20, and each functional block thereof are described.

The analysis device 20 is different from the analysis device 10 in a point that the analysis device 20 includes an analysis execution unit 201 in place of an analysis execution unit 101, and an analysis rule storage unit 202 in place of an analysis rule storage unit 102. Further, the analysis device 20 is different from the analysis device 10 in a point that the analysis device 20 includes a log storage unit 205 in place of an analysis state storage unit 103. Furthermore, as the analysis device 20, for example, it is possible to employ an analysis device in which an analysis delay is large, but a resource utilization efficiency with respect to analysis is high (e.g., a batch-processing type analysis device), as compared to the analysis device 10. Note that the analysis device 20 is associated with one example embodiment of another analysis device in the present invention.

Note that it is possible to configure the analysis device 20 by hardware elements similar to those of the analysis device 10 in the first example embodiment according to the present invention described with reference to FIG. 2. In this case, the log storage unit 205 is constituted of a memory 1002. However, a hardware configuration of the analysis device 20 and each functional block thereof is not limited to the above-described configuration.

The analysis execution unit 201 is configured substantially similarly to the analysis execution unit 101 described in the first example embodiment according to the present invention, but differs in the following point. Specifically, the analysis execution unit 101 executes analysis based on an analysis rule, each time data being an object of analysis are received. In contrast, when data being an object of analysis is received, the analysis execution unit 201 stores the data in the log storage unit 205, and thereafter, executes analysis with respect to the stored data. Note that data to be received from the sensor 6 by the analysis execution unit 201 are the same as data to be received from the sensor 6 by the analysis execution unit 101 of the analysis device 10. In other words, the sensor 6 respectively transmits a same log to the analysis device 10 and the analysis device 20.

The analysis rule storage unit 202 is configured substantially similarly to the analysis rule storage unit 102 of the analysis device 10 described in the first example embodiment according to the present invention. However, the analysis rule storage unit 202 differs in a point that the analysis rule storage unit 202 stores, as an invalid analysis rule, in an initial state, an analysis rule identical to a valid analysis rule in the analysis rule storage unit 102. FIG. 14 is a diagram illustrating an example of information to be stored in the analysis rule storage unit 202. The example illustrated in FIG. 14 is different from the example of information, to be stored in the analysis rule storage unit 102 illustrated in FIG. 3, in a point that information indicating that an analysis rule is invalid is included in each entry in a table. An invalid analysis rule in the analysis rule storage unit 202 indicates that the analysis rule is not an object to be executed by the analysis execution unit 201.

The log storage unit 205 stores data received by the analysis execution unit 201. Data stored in the log storage unit 205 are referred to, when analysis by the analysis execution unit 201 is executed. FIG. 15 is a diagram illustrating an example of information to be stored in the log storage unit 205. FIG. 15 illustrates a table in which entries indicating received data are stored. Each entry is constituted of pieces of information respectively indicating a reception time, a Customer ID, a Signature ID, a Source IP address, and a Destination IP address. For example, an uppermost entry in FIG. 15 indicates that data in which a signature ID is 96, a source IP address is 10.0.1.1, and a destination IP address is 10.0.1.2 are received from the sensor 6 whose customer ID is 2 at a point of time 1453448586.923002619. The analysis execution unit 201 is enabled to determine whether all conditions of the analysis rule are satisfied by referring to an entry included in the present table, when executing analysis based on the analysis rule.

Next, the control device 21 and each functional block thereof are described.

The control device 21 is different from the control device 11 according to the first example embodiment in the present invention in a point that the control device 21 includes an evaluation result storage unit 212 in place of an evaluation result storage unit 112, and an analysis rule control unit 214 in place of an analysis rule control unit 114.

Note that it is possible to configure the control device 21 and each functional block thereof by hardware elements similar to those of the control device 11 according to the first example embodiment in the present invention described with reference to FIG. 2. However, a hardware configuration of the control device 21 and each functional block thereof is not limited to the above-described configuration.

The evaluation result storage unit 212 stores an evaluation result with respect to an analysis result output from the analysis execution unit 101 of the analysis device 10, and the analysis execution unit 201 of the analysis device 20. FIG. 16 is a diagram illustrating an example of information to be stored in the evaluation result storage unit 212. The example of FIG. 16 illustrates a table in which entries constituted of pieces of information respectively indicating an evaluation completion time, an analysis device ID, an analysis rule ID, and an evaluation result are stored. An evaluation completion time indicates a point of time when an evaluation result is generated or acquired by the evaluation device 8. Further, an analysis device ID is an ID for uniquely identifying an analysis device being an output source of an analysis result being an object to be evaluated. In this example, it is assumed that an ID of the analysis device 10 is "A", and an ID of the analysis device 20 is "B". Further, an analysis rule ID is an ID for uniquely identifying an analysis rule applied when an analysis result being an object to be evaluated is output. An evaluation result is information generated or acquired by the evaluation device 8, and indicates certainty with respect to an analysis result, for example.

For example, an uppermost entry in FIG. 16 indicates that an evaluation result being false positive with respect to an analysis result output from the analysis device 10 (ID=A) by application of an analysis rule ID(3) is acquired or generated at a point of time 2016/01/22 17:00.00. In this way, the evaluation result storage unit 212 is able to store one or more entries including an evaluation result with respect to an analysis result output from the analysis execution unit 101 of the analysis device 10, or the analysis execution unit 201 of the analysis device 20.

The analysis rule control unit 214 is configured substantially similarly to the analysis rule control unit 114 described in the first example embodiment according to the present invention, but differs in the following point. Specifically, the analysis rule control unit 214 controls an analysis rule stored in the analysis rule storage unit 202 of the analysis device 20, in addition to controlling an analysis rule stored in the analysis rule storage unit 102 of the analysis device 10. Control of an analysis rule stored in the analysis rule storage unit 202 is executed via the analysis rule management unit 104. More specifically, when the analysis rule control unit 214 controls the analysis device 10 not to execute analysis based on a certain analysis rule, the analysis rule control unit 214 controls an analysis rule stored in the analysis rule storage unit 202 of the analysis device 20 in such a way that analysis based on the analysis rule is executed by the analysis device 20.

For example, it is assumed that the information illustrated in FIG. 3 is stored in the analysis rule storage unit 102, and the information illustrated in FIG. 14 is stored in the analysis rule storage unit 202. At this occasion, it is assumed that a free storage capacity being a usage status of the analysis state storage unit 103 falls below a predefined threshold value. In this case, control to be executed with respect to the analysis device 10 by the analysis rule control unit 214 is similar to control by the analysis rule control unit 114 according to the first example embodiment in the present invention. Specifically, in this case, the analysis rule control unit 214 identifies an analysis rule (e.g. ID=3) in which a false positive rate exceeds a threshold value, as an evaluation result, and executes control of invalidating the identified analysis rule. Thus, in the analysis device 10, storing analysis state information that exceeds a capacity of the analysis state storage unit 103 is suppressed, and it becomes possible to continue execution of an analysis rule in which a true positive rate is relatively high (effect to be acquired by analysis is high), as compared to an invalidated analysis rule, similarly to the above.

In the present example embodiment, the analysis rule control unit 214 further executes the following control with respect to the analysis device 20. Specifically, the analysis rule control unit 214 instructs the analysis rule management unit 104 of the analysis device 20 to validate an analysis rule associated with an analysis rule (e.g. ID=3) invalidated in the analysis device 10. Thus, the analysis rule control unit 214 controls the analysis execution unit 201 to execute analysis based on the analysis rule. Under this control, the analysis rule management unit 104 of the analysis device 20 searches an entry having the analysis rule ID(3) in the analysis rule storage unit 202, and changes information indicating validity of an associated entry from invalid to valid. Thus, analysis of an analysis rule, which is invalidated in the analysis device 10, and in which a false positive rate exceeds a threshold value (effect to be acquired by analysis is low), is also continued in the analysis device 20.

Next, each device to be connected to the information processing system 2 is described.

The sensor 6 is configured substantially similarly to the sensor 5 in the first example embodiment according to the present invention. However, the sensor 6 is different from the sensor 5 in a point that the sensor 6 is connected to the analysis execution unit 201 of the analysis device 20, in addition to being connected to the analysis execution unit 101 of the analysis device 10. Further, the sensor 6 is different from the sensor 5 in a point that generated data is transmitted to the analysis execution unit 201 of the analysis device 20, in addition to being transmitted to the analysis execution unit 101 of the analysis device 10.

The evaluation device 8 is configured substantially similarly to the evaluation device 7 in the first example embodiment according to the present invention. However, the evaluation device 8 is different from the evaluation device 7 in a point that the evaluation device 8 generates or acquires an evaluation result with respect to an analysis result to be output from the analysis execution unit 201 of the analysis device 20, in addition to an analysis result to be output from the analysis execution unit 101 of the analysis device 10.

Note that, in FIG. 13, the analysis device 10, the analysis device 20, and the control device 21 are exemplified as different devices. The example embodiment is not limited to the above. A part or the entirety of these devices may be configured as an integral device. Further, a device such that a part or the entirety of these devices are integrated may include the evaluation device 8.

Next, an operation of the present example embodiment is described in detail with reference to the drawings.

Figure 17:
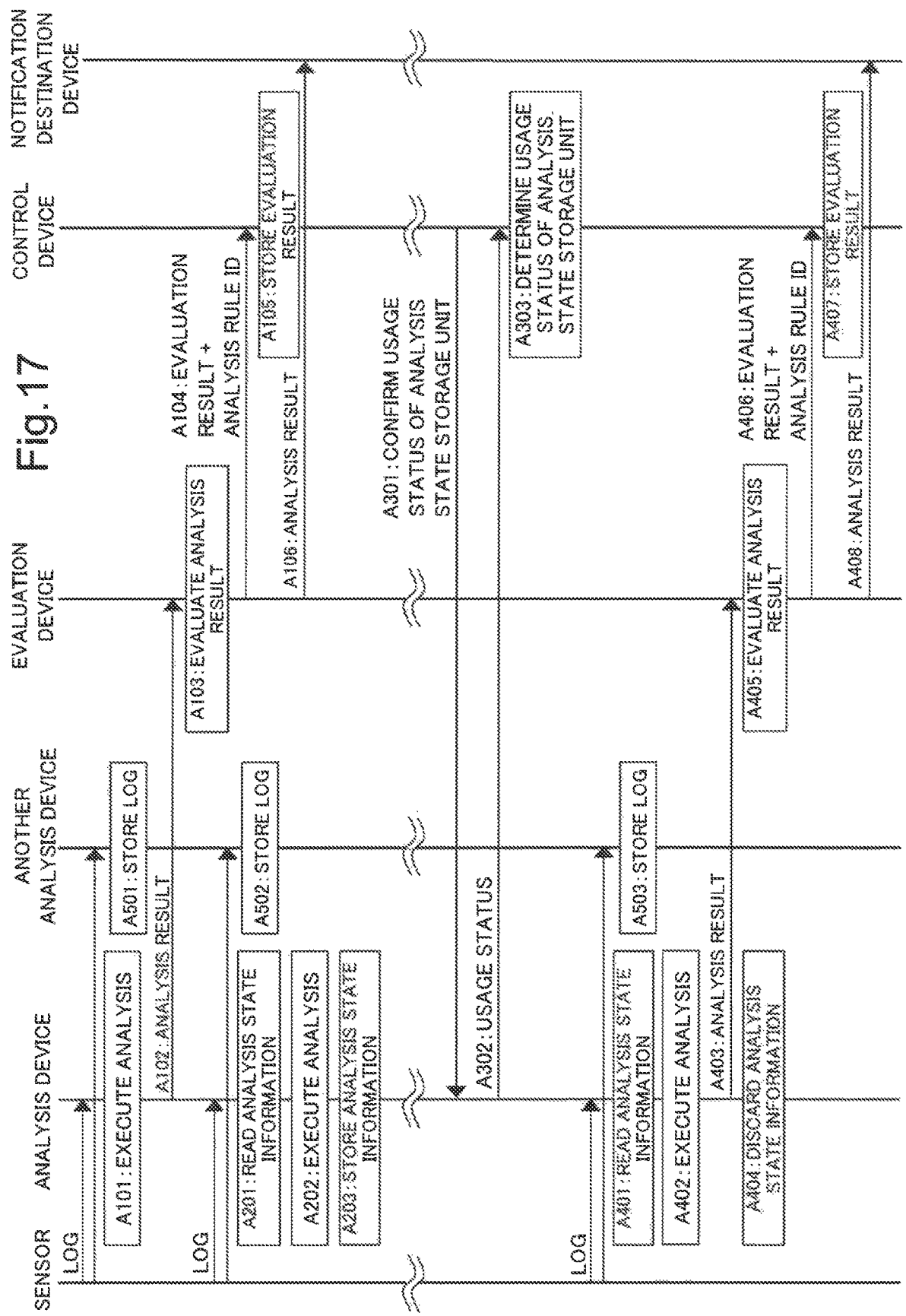
FIG. 17 is a sequence diagram describing an operation of the information processing system in the second example embodiment according to the present invention, in a steady state.

First of all, an operation of the second example embodiment according to the present invention in a steady state is illustrated in a sequence diagram of FIG. 17. Note that, in the following description on an operation, data being an object of analysis are also referred to as a log.

In FIG. 17, first of all, the group of sensors 6 transmit a log to the analysis device 10 and the analysis device 20.

Herein, since an operation of the analysis device 10 that receives a log, and operations of the evaluation device 8 and the control device 21 that follow are similar to those in the first example embodiment described with reference to FIG. 6, description thereof is omitted.

Next, in the analysis device 20 which is receiving a log, the analysis execution unit 201 stores the received log in the log storage unit 205. Further, the analysis execution unit 201 determines whether analysis to be executed is present, with respect to the stored log (Step A501). Details of determination processing will be described later. Herein, it is assumed that analysis to be executed is not present. Therefore, the analysis execution unit 201 finishes the processing, without executing analysis. Note that since operations of Steps A502 and A503 are similar to that of Step A501, description thereof is omitted.

Figure 18:
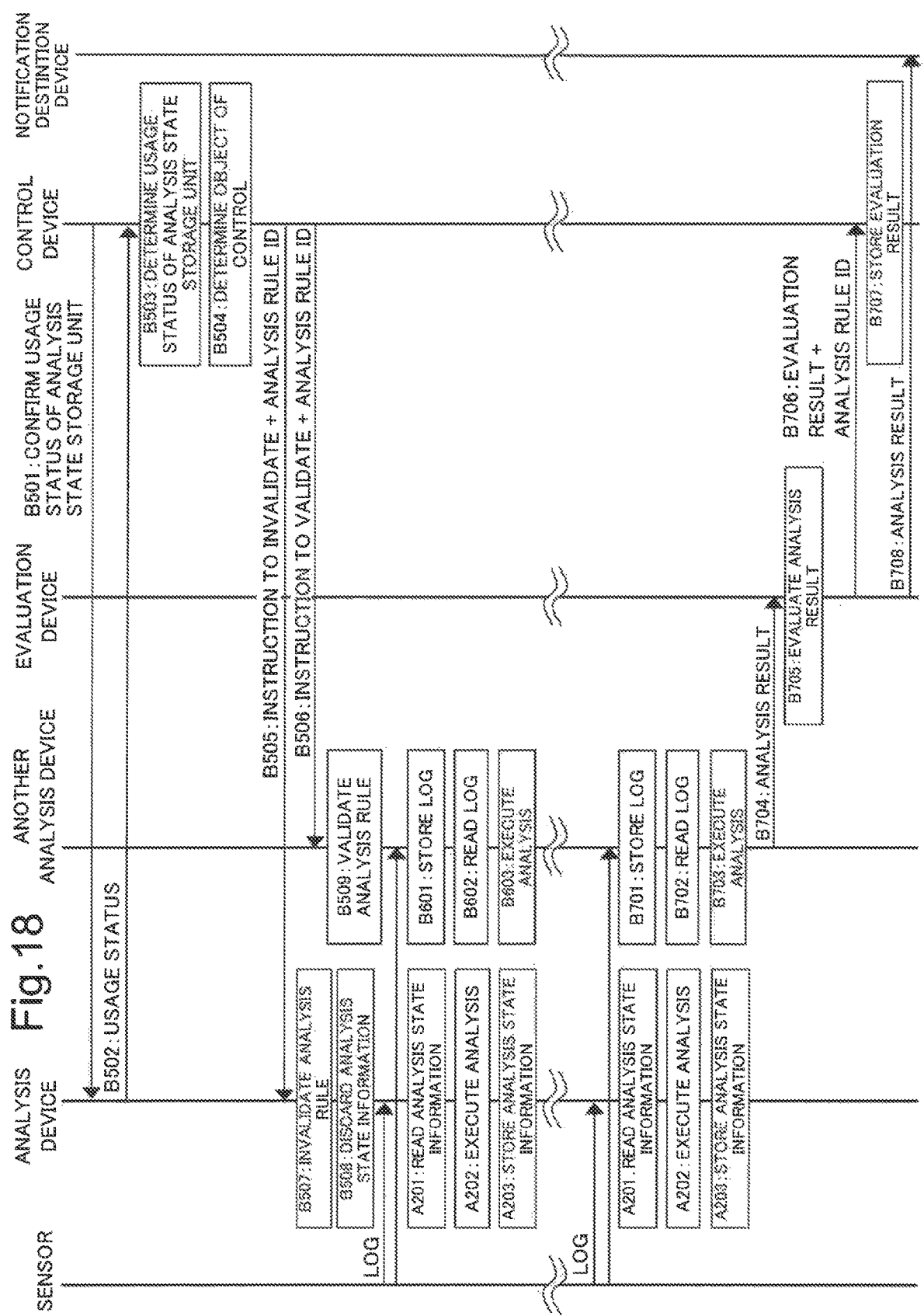
FIG. 18 is a sequence diagram describing an operation of the information processing system in the second example embodiment according to the present invention, in a resource depletion state.

Next, an operation of the second example embodiment according to the present invention in a resource depletion state is illustrated in a sequence diagram of FIG. 18.

In FIG. 18, Steps B501 to B509 indicate an operation of controlling an analysis rule, when a usage status of the analysis state storage unit 103 satisfies a predetermined depletion condition.

Herein, first of all, the control device 21 and the analysis device 10 execute Steps B501 to B503. Since operations of Steps B501 to B503 are similar to those of Steps B101 to B103 in the first example embodiment according to the present invention described with reference to FIG. 7, description thereof is omitted. Thus, the analysis rule control unit 214 of the control device 21 acquires a determination result as to whether a usage status of the analysis state storage unit 103 of the analysis device 10 satisfies a predetermined depletion condition. Herein, it is assumed that a usage status satisfies a predetermined depletion condition.

In view of the above, the analysis rule control unit 214 determines an analysis rule being an object of control, based on lowness of an evaluation result stored in the evaluation result storage unit 212 (Step B504). An analysis rule being an object of control becomes an object to be invalidated in the analysis device 10, and also becomes an object to be validated in the analysis device 20.

Next, the analysis rule control unit 214 transmits, to the analysis device 10, information indicating an instruction to invalidate, and an analysis rule ID for uniquely identifying an analysis rule being an object of control, as a pair (Step B505).

Further, the analysis rule control unit 214 transmits, to the analysis device 20, information indicating an instruction to validate, and an analysis rule ID for uniquely identifying an analysis rule being an object of control, as a pair (Step B506).

Herein, the analysis device 10 that receives information indicating an instruction to invalidate executes Steps B507 to B508. Since operations of Steps B507 to B508 are similar to those of Steps B106 to B107 in the first example embodiment according to the present invention described with reference to FIG. 7, description thereof is omitted. Thus, the analysis device 10 is able to avoid depletion of a free storage capacity of the analysis state storage unit 103, and continue execution of analysis.

Next, when receiving information indicating an instruction to validate and an analysis rule ID, the analysis rule management unit 104 of the analysis device 20 validates an analysis rule of the received analysis rule ID in the analysis rule storage unit 202 (Step B509).

Subsequently, as illustrated in FIG. 18, it is assumed that a log is transmitted from the group of sensors 6 to the analysis device 10 and the analysis device 20.

At this occasion, when an analysis rule that is not invalidated in Step B507 is present, the analysis device 10 that receives a log executes analysis based on the analysis rule. Herein, it is assumed that the analysis device 10 executes operations of Steps A201 to A203 where analysis in which reference of an analysis state is necessary is executed, but an analysis result is not output. Since operations of Steps A201 to A203 are similar to those in FIG. 6, description thereof is omitted.

Further, the analysis device 20 that receives a log stores received data in the log storage unit 205 (Step B601).

Further, the analysis device 20 determines whether an analysis rule to be executed is present. Herein, as an analysis rule to be executed, an analysis rule validated in Step B509 is at least present.

In view of the above, the analysis execution unit 201 reads the stored log (Step B602), and executes analysis (Step B603).

Herein, it is assumed that data read from the log storage unit 205 do not satisfy an analysis rule. In view of the above, the analysis execution unit 201 finishes the processing, without outputting an analysis result.

Further, thereafter, as illustrated in FIG. 18, it is assumed that a log is transmitted from the group of sensors 6 to the analysis device 10 and the analysis device 20.

Herein, it is assumed that the analysis device 10 executes operations of Steps A201 to A203 where analysis in which reference of an analysis state is necessary is executed, but an analysis result is not output, with respect to a received log. Since operations of Steps A201 to A203 are similar to those in FIG. 6, description thereof is omitted.

Further, it is assumed that the analysis device 20 executes operations where analysis in which reference of an analysis state is necessary is executed, and outputs an analysis result, with respect to a received log.

Herein, first of all, when a log is received from the group of sensors 6, the analysis execution unit 201 of the analysis device 20 executes steps B701 to B703. Since operations of Steps B701 to B703 are similar to those of Steps B601 to B603 described above, description thereof is omitted. Thus, received data are stored in the log storage unit 205, and analysis is executed, based on a stored log.

Further, herein, it is assumed that data read from the log storage unit 205 satisfy an analysis rule. In view of the above, the analysis execution unit 201 notifies the evaluation device 8 of an analysis result (Step B704).

Further, the control device 21 and the evaluation device 8 execute Steps B705 to B708. Since operations of Steps B705 to B708 are similar to Steps A405 to A408 in an operation of the first example embodiment according to the present invention described with reference to FIG. 6, description thereof is omitted. Thus, an evaluation result with respect to an analysis result output in Step B704 is stored in the evaluation result storage unit 212.

Figure 19:
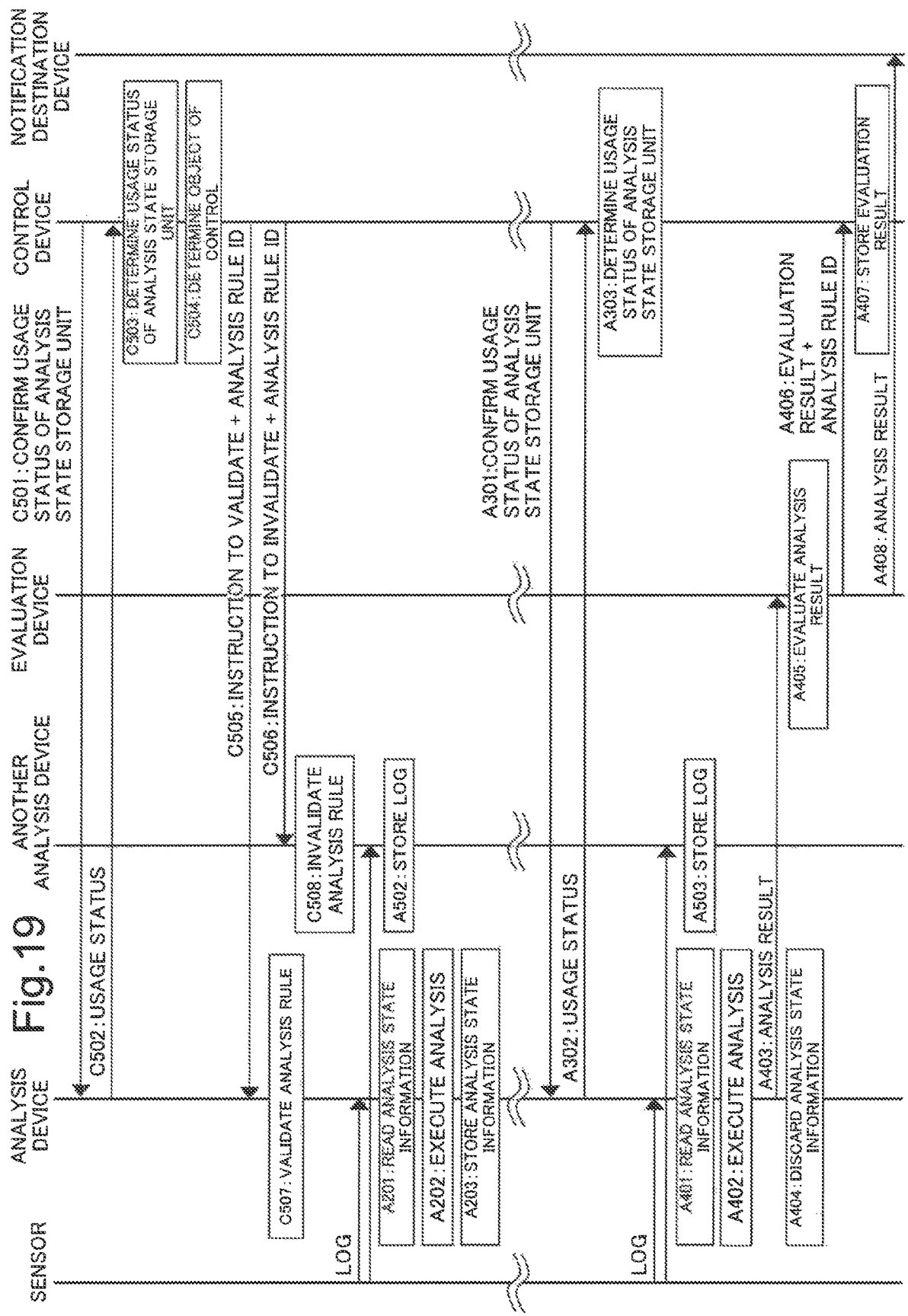
FIG. 19 is a sequence diagram describing an operation of the information processing system in the second example embodiment according to the present invention, in a resource surplus state.

Next, an operation of the second example embodiment according to the present invention in a resource surplus state is illustrated in a sequence diagram of FIG. 19.

In FIG. 9, Steps C501 to C508 indicate an operation of controlling an analysis rule, when a usage status of the analysis state storage unit 103 satisfies a predetermined surplus condition.

Herein, first of all, the control device 21 and the analysis device 10 execute Steps C501 to C503. Since operations of Steps C501 to C503 are similar to those of Steps C101 to C103 described with reference to FIG. 8, description thereof is omitted. Thus, the analysis rule control unit 214 of the control device 21 acquires a determination result as to whether a usage status of the analysis state storage unit 103 of the analysis device 10 satisfies a predetermined surplus condition. Herein, it is assumed that a usage status satisfies a predetermined surplus condition.

In view of the above, the analysis rule control unit 214 determines an analysis rule being an object of control, based on highness of an evaluation result stored in the evaluation result storage unit 212 (Step C504). An analysis rule being an object of control becomes an object to be validated in the analysis device 10, and also becomes an object to be invalidated in the analysis device 20.

Next, the analysis rule control unit 214 transmits, to the analysis device 10, information indicating an instruction to validate, and an analysis rule ID for uniquely identifying an analysis rule being an object of control, as a pair (Step C505).

Further, the analysis rule control unit 214 transmits, to the analysis device 20, information indicating an instruction to invalidate, and an analysis rule ID for uniquely identifying an analysis rule being an object of control, as a pair (Step C506).

Herein, the analysis device 10 that receives information indicating an instruction to validate executes Step C507. Since an operation of Step C507 is similar to that of Step C106 in the first example embodiment according to the present invention described with reference to FIG. 8, description thereof is omitted. Thus, thereafter, analysis based on an analysis rule of a validated analysis rule ID is started by the analysis execution unit 101.

Next, when receiving information indicating an instruction to invalidate and an analysis rule ID, the analysis rule management unit 104 of the analysis device 20 invalidates an analysis rule of the received analysis rule ID in the analysis rule storage unit 202 (Step C508). Thus, in the analysis device 20, analysis based on an analysis rule executed by the analysis execution unit 201 in place of the analysis execution unit 101 is stopped.

Subsequently, as illustrated in FIG. 19, it is assumed that a log is transmitted from the group of sensors 6 to the analysis device 10 and the analysis device 20.

Herein, it is assumed that a valid analysis rule is not stored in the analysis rule storage unit 202 of the analysis device 20 by an invalidation operation in Step C508.

Therefore, when a log is received thereafter, the analysis device 20 stores a log by executing Steps A502 or A503. Since an operation of Step A502 or A503 is similar to that of the analysis device 20 described with reference to FIG. 17, description thereof is omitted.

Further, since operations of the analysis device 10, the evaluation device 8, and the control device 21, when a log is received thereafter, are similar to those in the first example embodiment according to the present invention described with reference to FIG. 6 in a steady state, description thereof is omitted.

Next, an operation of acquiring an evaluation result by the control device 21 is described. Since an operation of acquiring an evaluation result by the control device 21 is similar to that in the first example embodiment according to the present invention described with reference to FIG. 9, illustration and description thereof are omitted.

Figure 20:
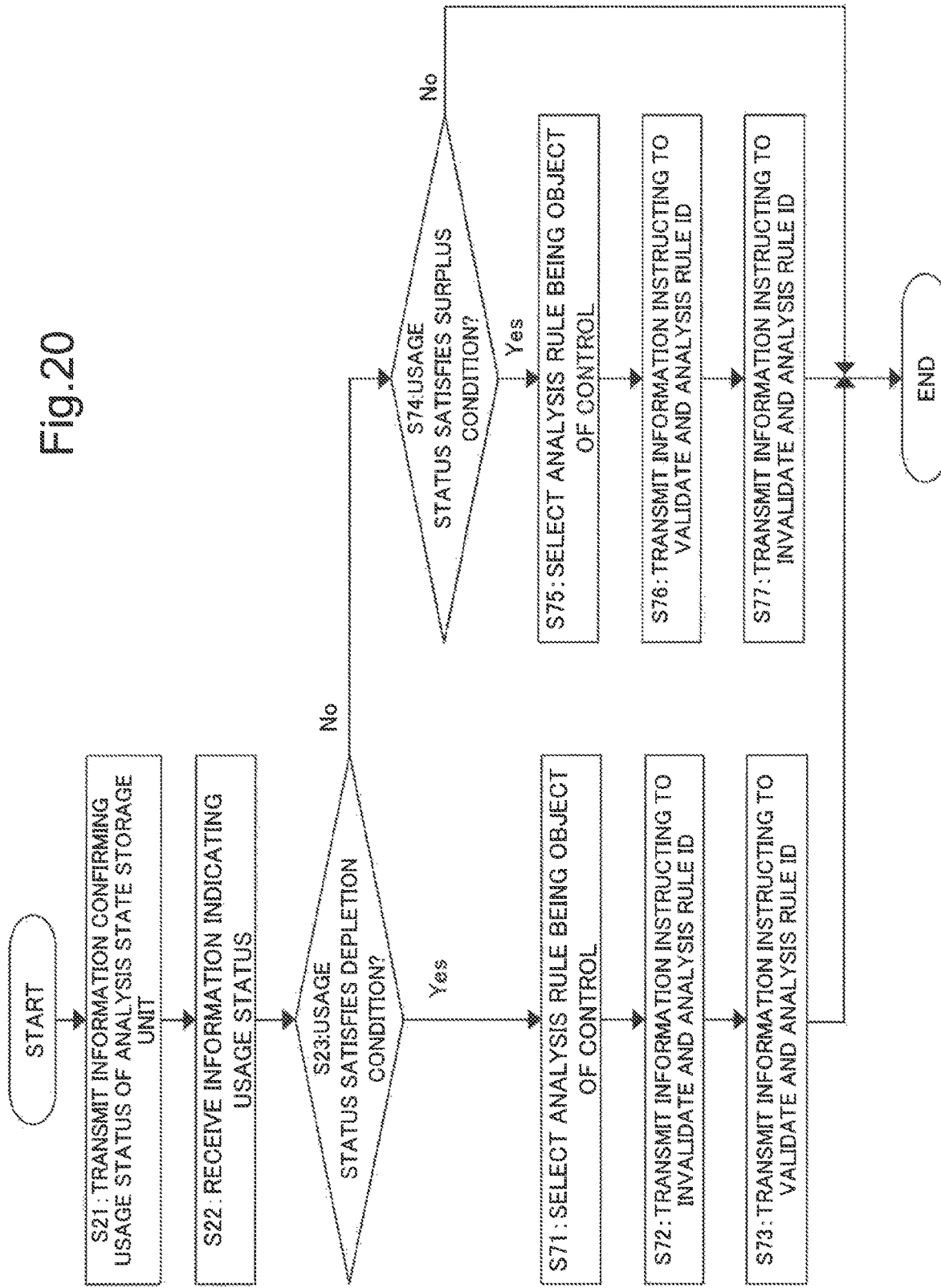
FIG. 20 is a flowchart describing an operation of monitoring an analysis state storage unit by a control device in the second example embodiment according to the present invention.

Next, details of an operation of monitoring a usage status of the analysis state storage unit 103, and controlling an analysis rule by the control device 21 are illustrated in a flowchart of FIG. 20.

In FIG. 20, first of all, the analysis state monitoring unit 111 of the control device 21 is operated similarly to the first example embodiment according to the present invention, regarding Steps S21 to S23, and determines whether a usage status of the analysis state storage unit 103 satisfies a predetermined depletion condition.

Herein, a case that a usage status of the analysis state storage unit 103 is determined to satisfy a depletion condition (Yes in Step S23) is described. In this case, the analysis rule control unit 214 selects an analysis rule being an object of control, based on lowness of an evaluation result stored in the evaluation result storage unit 212 (Step S71).

Next, the analysis rule control unit 214 transmits, to the analysis device 10, information instructing to invalidate, and an analysis rule ID for uniquely identifying an analysis rule being an object of control (Step S72).

Further, the analysis rule control unit 214 transmits, to the analysis device 20, information instructing to validate, and an analysis rule ID for uniquely identifying an analysis rule being an object of control (Step S73).

On the other hand, a case that a usage status of the analysis state storage unit 103 is determined not to satisfy a depletion condition (No in Step S23) is described. In this case, the analysis rule control unit 214 determines whether a usage status of the analysis state storage unit 103 satisfies a surplus condition (Step S74). Note that, as described in the first example embodiment according to the present invention, execution of Step S74 may be omitted, when a threshold value determined as a surplus condition is equal to a threshold value determined as a depletion condition.

Herein, a case that a usage status of the analysis state storage unit 103 is determined to satisfy a predetermined surplus condition (Yes in Step S74) is described. In this case, the analysis rule control unit 214 selects an analysis rule being an object of control, from among analysis rules invalidated in the analysis rule storage unit 102, based on highness of an evaluation result stored in the evaluation result storage unit 212 (Step S75).

Next, the analysis rule control unit 214 transmits, to the analysis device 10, information instructing to validate, and an analysis rule ID for uniquely identifying an analysis rule selected as an object of control (Step S76).

Further, the analysis rule control unit 214 transmits, to the analysis device 20, information instructing to invalidate, and an analysis rule ID for uniquely identifying an analysis rule selected as an object of control (Step S77).

On the other hand, a case that a usage status of the analysis state storage unit 103 is determined not to satisfy a predetermined surplus condition (No in Step S74) is described. In this case, the control device 21 finishes the processing.

Note that operations illustrated in FIG. 20 respectively associate with Steps A301 to A303, B501 to B506, and C501 to C506 in FIG. 17, FIG. 18, and FIG. 19. Further, as described with reference to FIG. 17, FIG. 18, and FIG. 19, operations illustrated in FIG. 20 are executed at each predetermined timing. Execution at each predetermined timing may be periodical execution, or may be repetitive execution based on a certain rule or a certain schedule.

Next, an operation of executing analysis by the analysis device 10 is described. Since an operation of executing analysis by the analysis device 10 is similar to that in the first example embodiment according to the present invention described with reference to FIG. 11, illustration and detailed description thereof are omitted.

Figure 21:
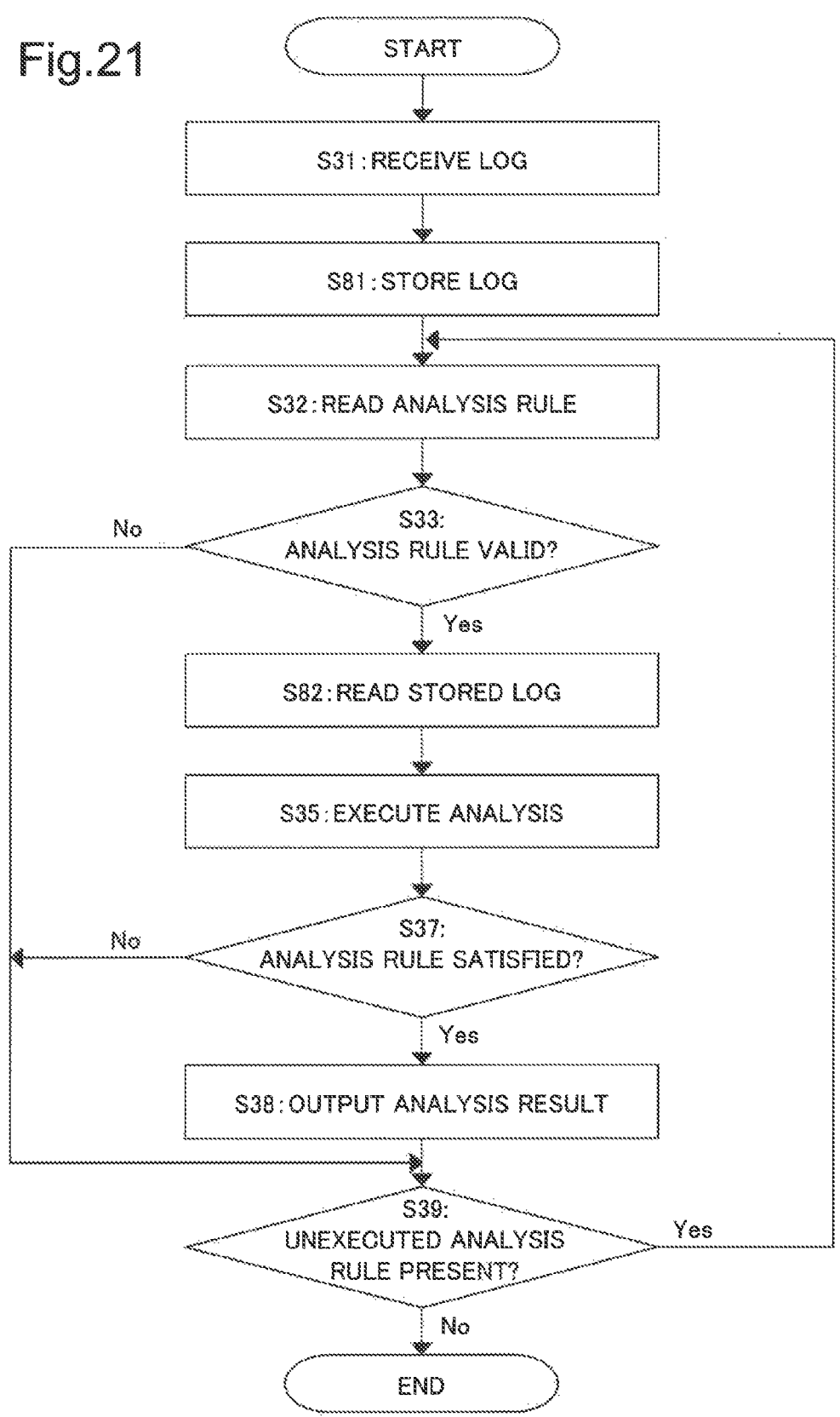
FIG. 21 is a flowchart describing an operation of executing analysis based on an analysis rule by another analysis device in the second example embodiment according to the present invention.

Next, details of an operation of executing analysis by the analysis device 20 are illustrated in FIG. 21.

As illustrated in FIG. 21, an operation of executing analysis by the analysis device 20 is different from an operation of executing analysis by the analysis device 10 described with reference to FIG. 11 in the following points.

One of the differences is that Step S81 where a received log is stored in the log storage unit 205 is executed, after a log is received from the group of sensors 6 in Step S31, and before an analysis rule is read in Step S32.

Further, another difference is that, when an analysis rule read in Step S32 is determined to be valid in Step S33, Step S82 where a stored log is read from the log storage unit 205 is executed, in place of Step S34 where analysis state information is read.

Further, still another difference is that Step S36 where analysis state information is stored is not executed, after analysis based on an analysis rule is executed in Step S35.

An operation of executing analysis by the analysis device 20 is similar to an operation of executing analysis by the analysis device 10, except for above-mentioned differences.

Next, an operation to be executed by the analysis device 10 based on an instruction of the control device 21 is described. Since an operation to be executed by the analysis device 10 based on an instruction of the control device 21 is similar to that in the first example embodiment according to the present invention described with reference to FIG. 12, illustration and detailed description thereof are omitted.

Figure 22:
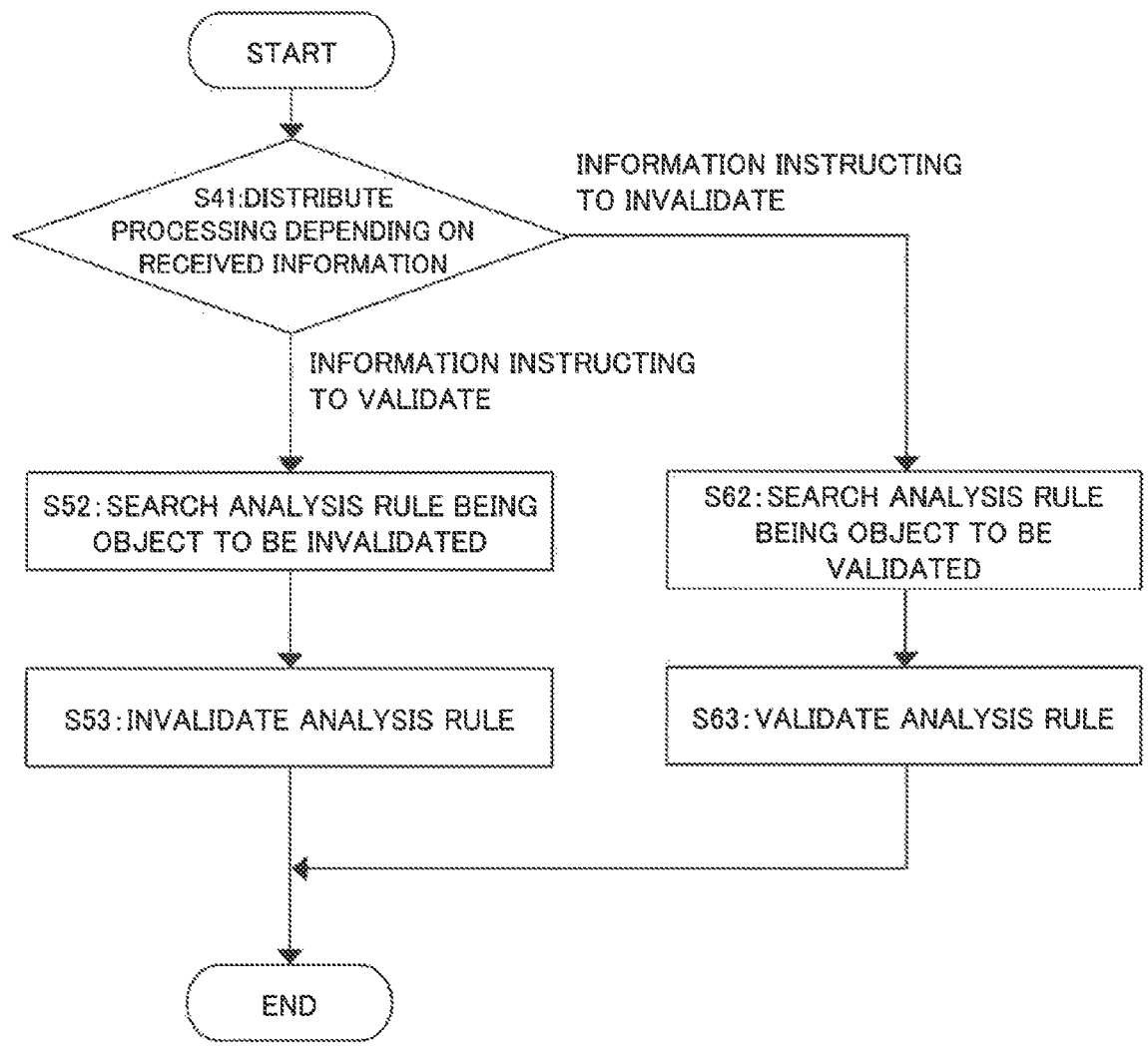
FIG. 22 is a flowchart describing an operation to be executed by another analysis device in the second example embodiment according to the present invention, under an instruction of the control device.

Next, details of an operation to be executed by the analysis device 20 based on an instruction of the control device 21 are illustrated in a flowchart of FIG. 22.

As illustrated in FIG. 22, an operation to be executed by the analysis device 20 based on an instruction of the control device 21 is different from an operation to be executed by the analysis device 10 based on an instruction of the control device 21 described with reference to FIG. 12, in a point that information confirming a usage status of the analysis state storage unit 103 is not received.

Further, another difference is such that, when information instructing to invalidate ("information instructing to invalidate" in Step S41) is received, Steps S54 to S55, where associated analysis state information is discarded, are not executed, after an analysis rule of an analysis rule ID being an object of control is invalidated.

Note that an operation, in a case that information instructing to validate ("information instructing to validate" in Step S41) is received, is similar to an operation, in a case that the analysis device 10 receives information instructing to validate.

Description on an operation to be executed by the analysis device 20 under an instruction of the control device 21 finishes as described above.

Next, advantageous effects of the second example embodiment according to the present invention are described.

An information processing system according to the second example embodiment in the present invention is able to reliably continue analysis, without stopping execution of a part of analysis, in an application where it is difficult to predict the amount or content of information to be input as an object of analysis.

A reason for this is described. In the present example embodiment, an information processing system includes another analysis device including at least an analysis execution unit, an analysis rule storage unit, and an analysis rule management unit, in addition to a configuration similar to the first example embodiment according to the present invention.

Further, the analysis rule storage unit of the another analysis device stores an analysis rule identical to an analysis rule in an analysis rule storage unit of an analysis device, in association with that the analysis rule is invalid in an initial state. Then, when an analysis rule control unit of a control device controls the analysis device, which is having analysis state information, not to execute analysis based on an analysis rule, the analysis rule control unit controls the another analysis device to execute analysis based on the analysis rule. Specifically, when an analysis state storage unit of an analysis device satisfies a predetermined depletion condition, the analysis rule control unit invalidates validity of an analysis rule selected based on lowness of an evaluation result in the analysis device, and validates validity thereof in the another analysis device. Further, when the analysis state storage unit of the analysis device satisfies a predetermined surplus condition, the analysis rule control unit selects an analysis rule being an object of control, based on highness of an evaluation result, from among analysis rules invalidated in the analysis rule storage unit of the analysis device. Then, the analysis rule control unit validates validity of a selected analysis rule being an object of control in the analysis device, which is including the analysis state storage unit, and invalidates validity thereof in the another analysis device.

As described above, the present example embodiment is able to continue execution of analysis, without stopping execution of analysis relating to an analysis rule in which an evaluation result is low, and without depleting a usage status of an analysis state storage unit. Thus, the present example embodiment is able to avoid an issue that it becomes impossible to store required analysis state information, and it becomes impossible to continue execution of desired analysis, due to constraint of an analysis state storage unit for storing analysis state information, when the amount or content of information being an object of analysis changes.

Third Example Embodiment

Figure 23:
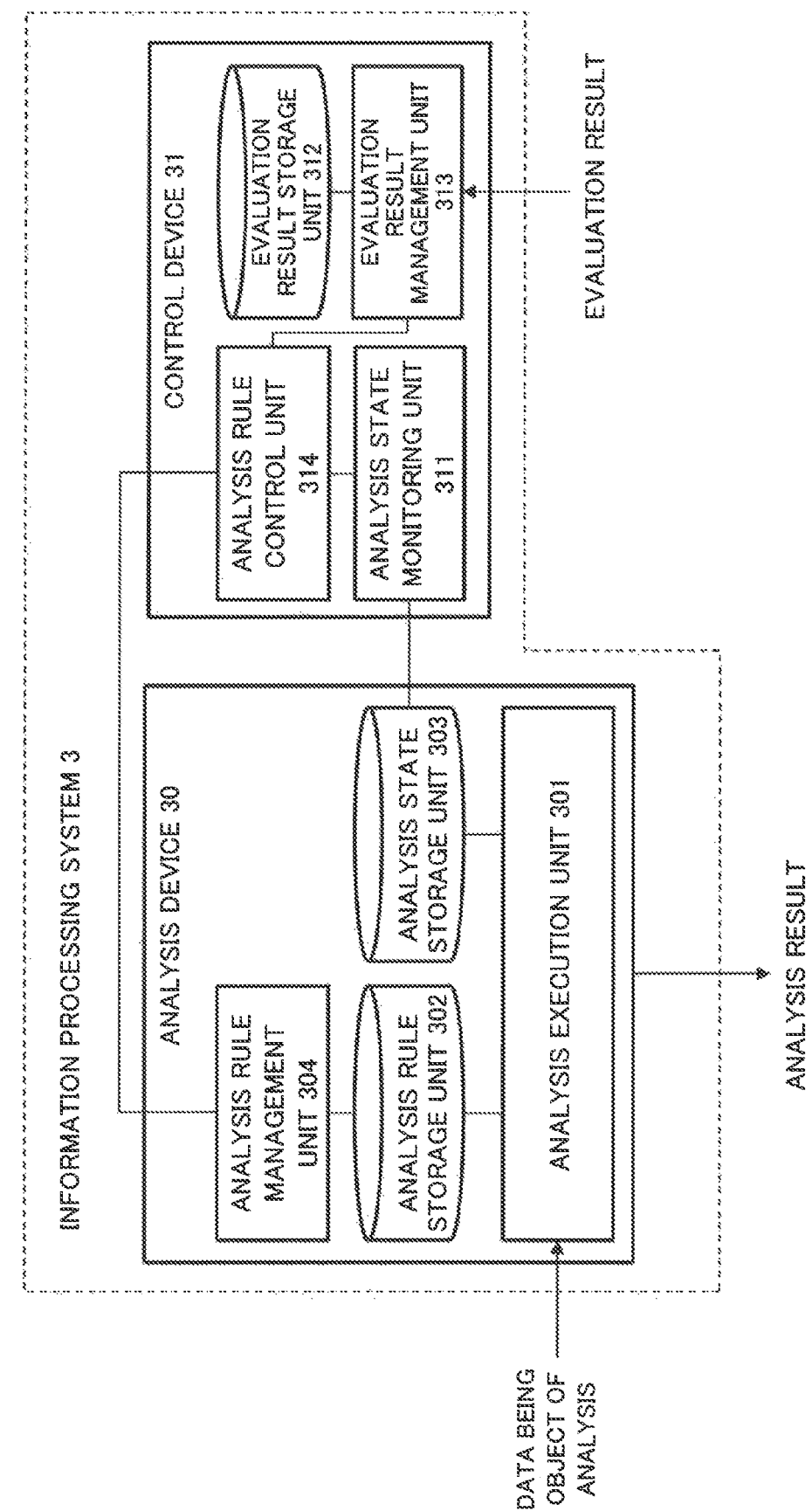
FIG. 23 is a block diagram illustrating a configuration of an information processing system in a third example embodiment according to the present invention.

In a third example embodiment, a minimum configuration of an example embodiment according to the present invention is described. First of all, FIG. 23 illustrates a configuration of an information processing system 3 according to the third example embodiment in the present invention. In FIG. 23, the information processing system 3 being a minimum configuration according to the present invention includes an analysis device 30 and a control device 31. The analysis device 30 and the control device 31 are communicably connected.

The analysis device 30 includes an analysis execution unit 301, an analysis rule storage unit 302, an analysis state storage unit 303, and an analysis rule management unit 304.

Further, the control device 31 includes an analysis state monitoring unit 311, an evaluation result storage unit 312, an evaluation result management unit 313, and an analysis rule control unit 314.

Herein, it is possible to configure respective functional blocks of the analysis device 30 and the control device 31 by hardware elements similar to those in the first example embodiment according to the present invention illustrated in FIG. 2. However, a hardware configuration of the analysis device 30, the control device 31, and each functional block thereof is not limited to the above-described configuration.

The analysis execution unit 301 executes analysis, based on an analysis rule with respect to data to be input as an object of analysis, and outputs an analysis result.

The analysis rule storage unit 302 stores an analysis rule.

The analysis state storage unit 303 stores analysis state information indicating a state of analysis to be generated or referred to by the analysis execution unit 301, when analysis is executed.

The analysis rule management unit 304 manages an analysis rule.

The analysis state monitoring unit 311 monitors a usage status of the analysis state storage unit 303.

The evaluation result management unit 313 acquires and manages an evaluation result with respect to an analysis result.

The evaluation result storage unit 312 stores an evaluation result.

The analysis rule control unit 314 controls an analysis rule via the analysis rule management unit 304, based on a usage status of the analysis state storage unit 303 and an evaluation result. Herein, control of an analysis rule may be changing a content of an analysis rule in such a way as to adjust the amount or content of analysis state information to be newly generated in analysis by the analysis execution unit 301, for example.

Note that, in FIG. 23, the analysis device 30 and the control device 31 are exemplified as different devices. The example embodiment is not limited to the above. These devices may be configured as an integral device.

An operation of the information processing system 3 configured as described above is described with reference to the drawings.

Figure 24:
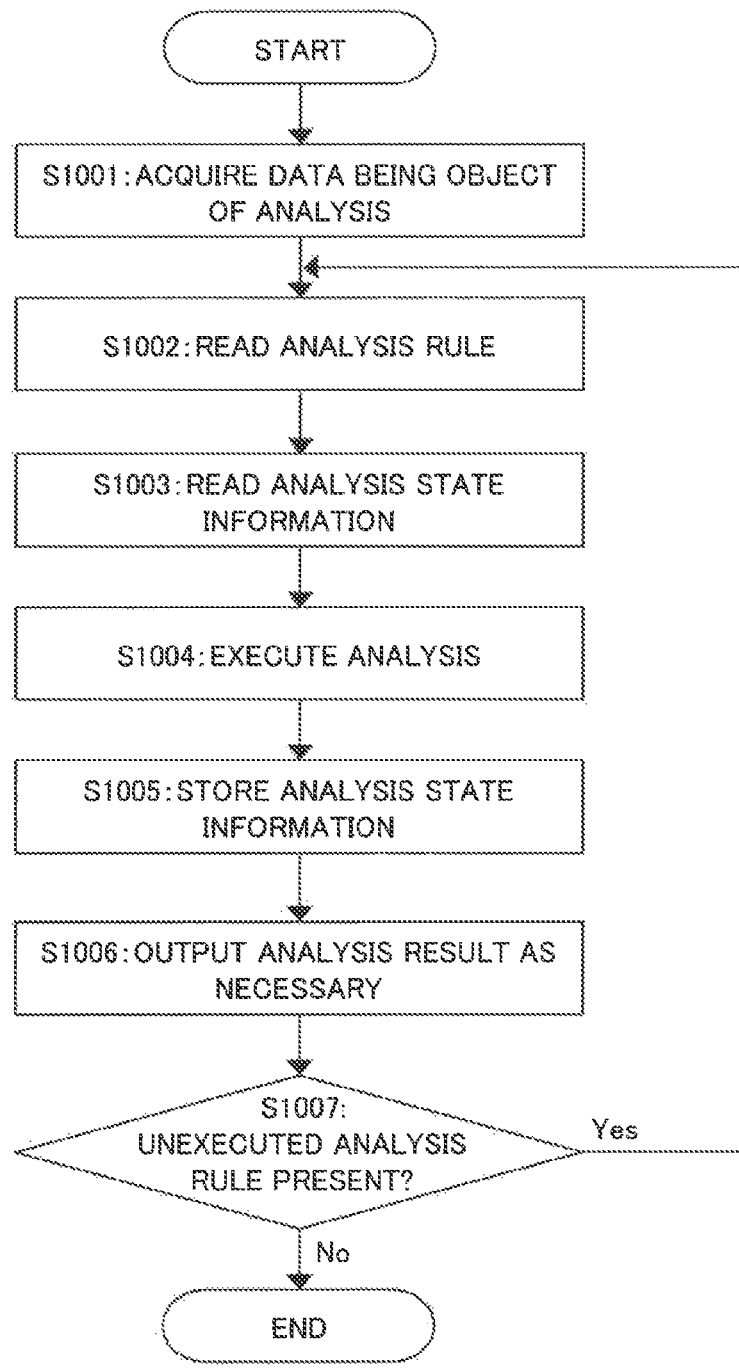
FIG. 24 is a flowchart describing an operation of executing analysis based on an analysis rule by an analysis device in the third example embodiment according to the present invention.

First of all, an operation of executing analysis by the analysis device 30 is illustrated in FIG. 24.

In FIG. 24, first of all, the analysis execution unit 301 acquires data being an object of analysis (Step S1001).

Next, the analysis execution unit 301 reads one analysis rule from the analysis rule storage unit 302 (Step S1002).

Next, the analysis execution unit 301 reads, from the analysis state storage unit 303, analysis state information necessary for execution of analysis (Step S1003).

Next, the analysis execution unit 301 executes analysis based on the analysis rule, while referring to the read analysis state information (Step S1004).

Next, when analysis state information usable in on-going analysis or another analysis is detected during execution of analysis, the analysis execution unit 301 stores the analysis state information in the analysis state storage unit 303 (Step S1005).

Next, the analysis execution unit 301 outputs an analysis result as necessary, based on the analysis rule (Step S1006). When output of an analysis result is not required, based on an analysis rule, an operation of Step S1006 is omitted.

Further, when execution of analysis is determined not to be required, based on the analysis rule read in Step S1002, operations of Steps S1003 to S1006 are omitted.

Next, the analysis execution unit 301 determines whether an unexecuted analysis rule with respect to data being an object of analysis is present (Step S1007).

Herein, when an unexecuted analysis rule with respect to data being an object of analysis is present (Yes in Step S1007), the analysis execution unit 301 repeatedly executes from Steps S1002 to S1007.

On the other hand, when an unexecuted analysis rule with respect to data being an object of analysis is not present (No in Step S1007), the analysis device 30 finishes the processing.

Next, an operation of acquiring an evaluation result by the control device 31 is described. Since an operation of acquiring an evaluation result by the control device 31 is similar to that in the first example embodiment according to the present invention described with reference to FIG. 9, illustration and description thereof are omitted.

Figure 25:
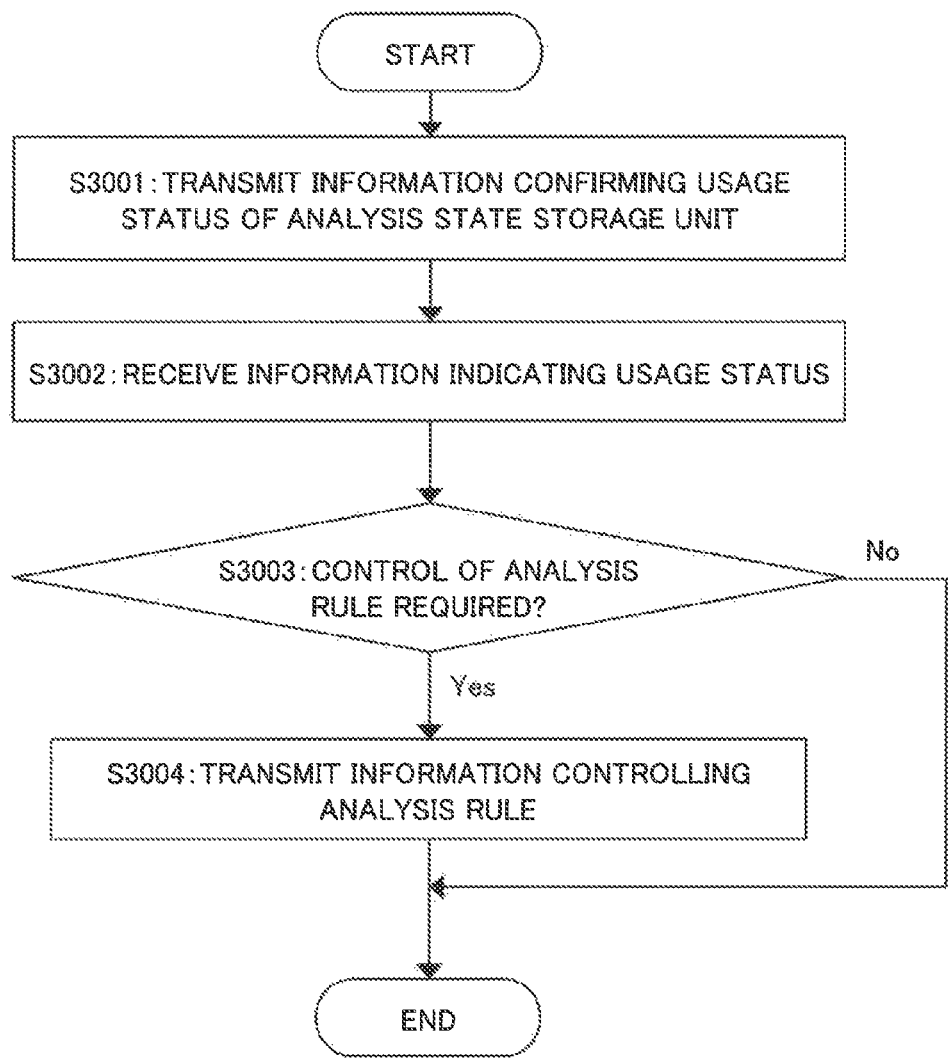
FIG. 25 is a flowchart describing an operation of monitoring an analysis state storage unit by a control device in the third example embodiment according to the present invention.

Next, details of an operation of monitoring a usage status of the analysis state storage unit 303, and controlling an analysis rule by the control device 31 are illustrated in a flowchart of FIG. 25.

In FIG. 25, first of all, the analysis state monitoring unit 311 transmits, to the analysis device 30, information confirming a usage status of the analysis state storage unit 303 (Step S3001).

Next, the analysis state monitoring unit 311 receives information indicating a usage status of the analysis state storage unit 303 (Step S3002).

Next, the analysis rule control unit 314 determines whether control of an analysis rule is required, based on the usage status of the analysis state storage unit 303 (Step S3003).

Herein, when control of an analysis rule is required, the analysis rule control unit 314 transmits, to the analysis device 30, information controlling an analysis rule, based on a usage status of the analysis state storage unit 303 and an evaluation result of the evaluation result storage unit 312 (Step S3004). For example, information controlling an analysis rule may be a content such that changing an analysis rule is instructed in such a way as to adjust the amount or content of analysis state information to be newly generated, when analysis by the analysis execution unit 301. Then, the control unit 31 finishes the processing.

Further, in Step S3003, also when control of an analysis rule is determined not to be required, the control device 31 finishes the processing.

Note that operations illustrated in FIG. 25 are executed at each predetermined timing. Execution at each predetermined timing may be periodical execution, or may be repetitive execution based on a certain rule or a certain schedule.

Figure 26:
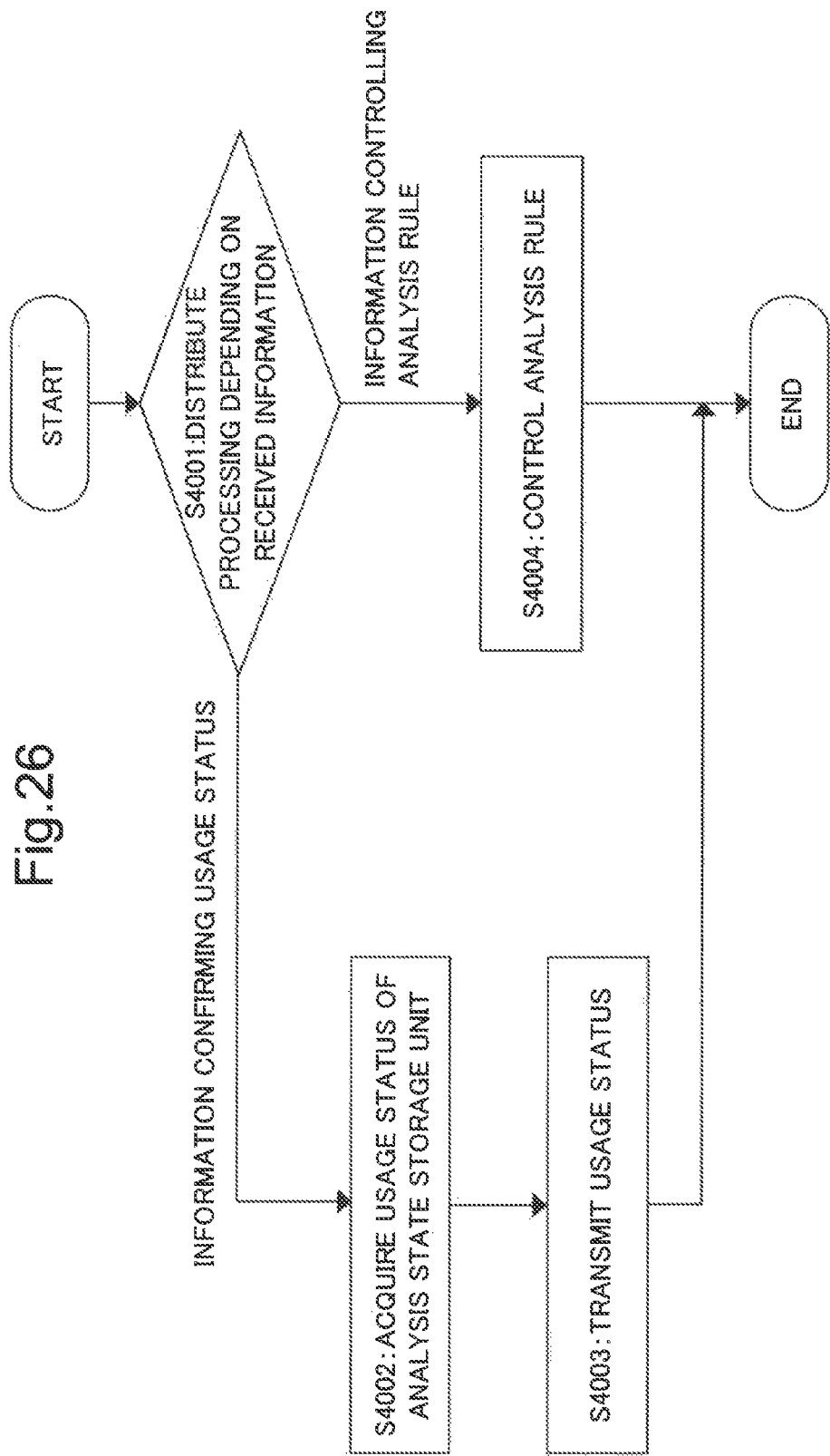
FIG. 26 is a flowchart describing an operation to be executed by the analysis device in the third example embodiment according to the present invention, under an instruction of the control device.

Next, details of an operation to be executed by the analysis device 30 based on an instruction of the control device 31 are illustrated in a flowchart of FIG. 26.

In FIG. 26, first of all, a case that the analysis device 30 receives information confirming a usage status of the analysis state storage unit 303 ("information confirming a usage status" in Step S4001) is described. In this case, the analysis device 30 acquires information indicating a usage status of the analysis state storage unit 303 (Step S4002).

Next, the analysis device 30 transmits information indicating a usage status to the control device 31 (Step S4003), and finishes the processing.

Further, a case that the analysis device 30 receives information controlling an analysis rule ("information controlling an analysis rule" in Step S4001) is described. Herein, it is assumed that information controlling an analysis rule includes information for identifying an analysis rule being an object of control, and a content of control. In this case, the analysis rule management unit 304 changes an analysis rule being an object of control in accordance with a content of control in the analysis rule storage unit 302 (Step S4004).

Description on an operation to be executed by the analysis device 30 under an instruction of the control device 31 finishes as described above.

Next, advantageous effects of the third example embodiment according to the present invention are described.

An information processing system according to the third example embodiment in the present invention is able to more reliably continue execution of analysis, in an application where it is difficult to predict the amount or content of information to be input as an object of analysis.

A reason for this is described. In the present example embodiment, in an analysis device, an analysis execution unit executes an analysis rule, based on an analysis rule, and outputs an analysis result. Further, an analysis rule storage unit stores an analysis rule. Furthermore, an analysis rule management unit manages an analysis rule in the analysis rule storage unit. Then, an analysis state storage unit stores analysis state information to be generated or referred to, when analysis by the analysis execution unit is executed. And, in a control device, an analysis state monitoring unit monitors a usage status of the analysis state storage unit. Moreover, an evaluation result management unit acquires an evaluation result with respect to an analysis result, and stores and manages the evaluation result in an evaluation result storage unit. Then, an analysis rule control unit controls an analysis rule via the analysis rule management unit, based on a usage status of the analysis state storage unit and an evaluation result of the evaluation result storage unit. By control of an analysis rule, for example, the analysis rule is changed to a content such that the amount or content of analysis state information to be newly generated in analysis by the analysis execution unit is adjusted.

As described above, the present example embodiment controls an analysis rule as necessary, based on a usage status of an analysis state storage unit, and an evaluation result with respect to an analysis result, in an analysis execution device. Thus, the present example embodiment adjusts the amount or content of analysis state information to be newly generated and stored in an analysis state storage unit, in an analysis execution device. Consequently, the present example embodiment is able to avoid a situation that it becomes impossible to store analysis state information necessary for analysis due to constraint of an analysis state storage unit for storing analysis state information, when the amount or content of information being an object of analysis is changed. Further, the present example embodiment is able to reliably continue execution of analysis.

In the foregoing, each example embodiment according to the present invention is described. The present invention, however, is not limited to the above-described example embodiments. Further modifications, replacements and adjustments may be added, as far as the modifications, replacements and adjustments do not depart from the basic technical idea of the present invention.

For example, a system configuration, a configuration of each device, a sequence, and a flowchart illustrated in each drawing are an example for aiding understanding of the present invention. The present invention is not limited to configurations illustrated in these drawings.

Further, in the above-described each example embodiment according to the present invention, functional blocks of an analysis device may be distributed among a plurality of devices, and implemented. Furthermore, functional blocks of a control device may be distributed among a plurality of devices, and implemented.

Further, in the above-described first and second example embodiments according to the present invention, an example is described in which an analysis device receives a log being an object of analysis from a group of sensors. However, data being an object of analysis in the present invention are not limited to a log output from the group of sensors. As data being an object of analysis, it is possible to apply any data collected on a real-time basis, on a non-real-time basis, on-line, or off-line. For example, in an information processing system according to the present invention, prior to start of analysis, data collected or accumulated by using a communication line or another medium in advance may be used as an object of analysis.

Further, in the above-described first and second example embodiments according to the present invention, an example is described in which an analysis state monitoring unit of a control device acquires an amount of available resources (free storage capacity) as a usage status of an analysis state storage unit. The present invention is not limited to the above. The analysis state monitoring unit may acquire, as a usage status, another piece of information relating to a usage status of the analysis state storage unit, or a combination of these pieces of information.

Further, in the above-described first and second example embodiments according to the present invention, an example is described in which an analysis rule control unit of a control device applies, as a predetermined depletion condition (or a surplus condition), a condition that a free storage capacity falls below (or exceeds) a threshold value. The present invention is not limited to the above. The analysis rule control unit may apply, as a predetermined depletion condition (or a surplus condition), another condition relating to a usage status of an analysis state storage unit.

Further, in the above-described first and second example embodiments according to the present invention, an example is described in which an evaluation result storage unit of a control device stores, as an evaluation result with respect to an analysis result, information indicating true positive or false positive. Further, an example is described in which an analysis rule control unit of a control device identifies, as an analysis rule to be invalidated (or validated), an analysis rule in which a false positive rate exceeds (or does not exceed) a threshold value. The present invention is not limited to the above. The analysis rule control unit may identify an analysis rule being an object to be invalidated (or invalidated), based on another criteria. For example, an evaluation result storage unit may store, as an evaluation result with respect to an analysis result, a numerical value indicating certainty of an analysis result for each analysis rule ID. In this case, an analysis rule control unit may identify an analysis rule being an object to be invalidated (or validated), based on a total value of numerical values indicating certainty for each analysis rule ID. Further, an evaluation result storage unit may store, as an evaluation result with respect to an analysis result, a value based on importance of a sensor being a transmission source of a log that contributes to output of an analysis result. Importance of a sensor as described above may be determined in advance. Further, in this case, an analysis rule control unit may identify an analysis rule being an object to be invalidated (or validated), based on a total value of numerical values based on importance of a sensor for each analysis rule ID.

Further, in the above-described each example embodiment according to the present invention, an example is mainly described in which each functional block of an analysis device and a control device is implemented by a CPU that executes a computer program stored in a memory. The present invention is not limited to the above. A part or the entirety of each functional block, or a combination of these functional blocks may be implemented by a dedicated hardware.

Further, in the above-described each example embodiment according to the present invention, operations of an analysis device and a control device described with reference to each flowchart are stored in a storage device (storage medium) of a computer device, as a computer program according to the present invention. Further, the computer program may be read and executed by the CPU. Further, in the above-described case, the present invention is constituted by codes of the computer program, or a storage medium.

Further, it is assumed that each disclosure of the above-described PTLs and NPLs is incorporated in the present specification by reference. Changes and adjustments of example embodiments and examples are available within the scope of all disclosures (including the claims) of the present invention, and further based on basic technical ideas thereof. Furthermore, a variety of combinations and selections of various disclosure elements (including each element of each claim, each element of each example embodiment, each element of each drawing, and the like) are available within the scope of disclosure of the present invention. Specifically, it is needless to say that the present invention includes various modifications and alterations, which may be implemented by a person skilled in the art in accordance with all disclosures including the claims, and the technical ideas.

Further, the above-described each example embodiment is implementable by combining the example embodiments, as necessary.

Further, the present invention is not limited to the above-described each example embodiment, and is implementable in various aspects.

The whole or part of the exemplary embodiments disclosed above can be described as, but not limited to, the following supplementary notes.

(Supplementary Note 1)

An information processing system includes:

an analysis device and a control device, the analysis device including a first memory, and at least one first processor coupled to the first memory, the first processor performing first operations, the first operations including executing analysis, based on an analysis rule with respect to data to be input as an object of analysis, outputting an analysis result, and managing the analysis rule, the first memory storing the analysis rule, and storing analysis state information indicating a state of the analysis to be generated or referred to by the first processor; and the control device including a second memory, and at least one second processor coupled to the second memory, the second processor performing second operations, the second operations including monitoring a usage status of the first memory storing the analysis state information, acquiring and managing an evaluation result with respect to the analysis result, and controlling the analysis rule via the analysis device, based on a usage status of storing analysis state information and the evaluation result, the second memory storing the evaluation result.

(Supplementary Note 2)

The information processing system according to supplementary note 1, wherein the first operations further includes executing analysis based on the analysis rule for each of the analysis rule, the second memory stores the evaluation result for each of the analysis rule, and the second operations further includes controlling the analysis device as to whether analysis based on an analysis rule is executed by controlling the analysis rule selected based on the evaluation result, when the usage status of the first memory storing the analysis state information satisfies a predetermined condition.

(Supplementary Note 3)

The information processing system according to supplementary note 2, wherein the second operations further includes acquiring an amount of available resources, as the usage status of the first memory storing the analysis state information, and controlling the analysis device to stop execution of analysis based on the analysis rule by controlling the analysis rule selected based on lowness of the evaluation result, when the amount of available resources satisfies a predetermined depletion condition.

(Supplementary Note 4)

The information processing system according to supplementary note 3, wherein the second operations further includes deleting, from the the first memory, analysis state information relating to an analysis rule of analysis of which the execution is controlled to be stopped.

(Supplementary Note 5)

The information processing system according to supplementary note 3 or 4, wherein the second operations further includes controlling the analysis device to start execution of analysis based on an analysis rule by controlling the analysis rule selected based on highness of the evaluation result from among analysis rules of the analysis of which execution is stopped, when the amount of available resources satisfies a predetermined surplus condition.

(Supplementary Note 6)

The information processing system according to any one of supplementary notes 1 to 5, further includes another analysis device including a third memory, and at least one third processor coupled to the third memory, the third processor performing third operations, the third operations including at least executing analysis, based on an analysis rule with respect to data to be input as an object of analysis, outputting an analysis result, and managing the analysis rule, the third memory storing the analysis rule.

(Supplementary Note 7)

The information processing system according to supplementary note 6, wherein the second operations further includes controlling the analysis rule stored in the another analysis device via the another analysis device, in such a way that the another analysis device executes analysis based on the analysis rule, when controlling the analysis device not to execute analysis based on the analysis rule.

(Supplementary Note 8)

An analysis device in the information processing system according to any one of supplementary notes 1 to 7.

(Supplementary Note 9)

A control device in the information processing system according to any one of supplementary notes 1 to 7.

(Supplementary Note 10)

A method for a computer device to an analysis device, the analysis device including a first memory, and at least one first processor coupled to the first memory, the first processor performing first operations, the first operations including executing analysis, based on an analysis rule with respect to data to be input as an object of analysis, outputting an analysis result, and managing the analysis rule, the first memory storing the analysis rule, and storing analysis state information indicating a state of the analysis to be generated or referred to by the first processor, the method includes:

monitoring a usage status of storing analysis state information;

acquiring and managing an evaluation result with respect to the analysis result; and controlling the analysis rule via the analysis device, based on a usage status of the first memory storing the analysis state information and the evaluation result.

(Supplementary Note 11)

A non-transitory computer-readable storage medium storing a program, the program causing a computer device to perform a method to an analysis device, the analysis device including a first memory, and at least one first processor coupled to the first memory, the first processor performing first operations, the first operations including executing analysis, based on an analysis rule with respect to data to be input as an object of analysis, outputting an analysis result, and managing the analysis rule, the first memory storing the analysis rule, and storing analysis state information indicating a state of the analysis to be generated or referred to by the first processor, the method includes:

monitoring a usage status of the first memory storing the analysis state information;

acquiring and managing an evaluation result with respect to the analysis result;

controlling the analysis rule via the analysis device, based on a usage status of the first memory storing the analysis state information and the evaluation result.

In the foregoing, the present invention is described by way of the above-described example embodiments as an exemplary example. The present invention, however, is not limited to the above-described example embodiments. Specifically, the present invention is able to apply various aspects comprehensible to a person skilled in the art within the scope of the present invention.

This application is based upon and claims the benefit of priority from Japanese patent application No. 2016-11145, filed on Jun. 13, 2016, the disclosure of which is incorporated herein in its entirety by reference.

REFERENCE SIGNS LIST 1, 2, 3 Information processing system
10, 20, 30 Analysis device
11, 21, 31 Control device
101, 201, 301 Analysis execution unit
102, 202, 302 Analysis rule storage unit
103, 303 Analysis state storage unit
104, 304 Analysis rule management unit
111, 311 Analysis state monitoring unit
112, 212, 312 Evaluation result storage unit
113, 313 Evaluation result management unit
114, 214, 314 Analysis rule control unit
205 Log storage unit
1001, 1101 CPU
1002, 1102 Memory
1005, 1105 Network interface
5, 6 Sensor
7, 8 Evaluation device
9 Notification destination device

What is claimed is:

1. An information processing system comprising:
an analysis device and a control device,
the analysis device including:
a first memory, and
at least one first processor coupled to the first memory, the first memory
  storing a first entry including an analysis rule, and
  storing a second entry including analysis state information indicating a state of an analysis to be generated or referred to by the first processor; and
the first processor configured to perform first operations, the first operations including:
  executing the analysis, by using the analysis rule included in the first entry stored in the first memory, with respect to data to be input from at least one sensor as an object of analysis,
  storing the analysis state information to the second entry in the first memory when detecting the analysis state information during the analysis,
  outputting an analysis result to an evaluation device, and
  managing the analysis rule; and
the control device including:
a second memory, and
at least one second processor coupled to the second memory,
the second processor configured to perform second operations, the second operations including:
  monitoring a usage status of the first memory with respect to the second entry including the analysis state information,
  acquiring an evaluation result with respect to the analysis result from the evaluation device and storing the evaluation result into a third entry in the second memory, and
  controlling the analysis rule included in the first entry stored in the first memory of the analysis device, by using the usage status of the first memory with respect to the second entry including the analysis state information and the evaluation result included in the third entry in the second memory,
the second memory
  storing the third entry including the evaluation result,
wherein the usage status of the first memory includes at least a number of second entries stored in the first memory, and
the second operations further comprises:
  determining whether the usage status satisfies a predetermined depletion condition,
  determining the analysis rule as an object to be invalidated, by using lowness of the evaluation result included in the third entry stored in the second memory when the usage status satisfies the predetermined depletion condition, and
  transmitting information indicating the analysis rule to be invalidated to the analysis device, and
the first operation further comprises:
  invalidating the analysis rule relating to the information received from the control device, and
  deleting, from the first memory, the second entries including the analysis state information related to the invalidated analysis rule.

2. The information processing system according to claim 1, wherein
the second operations further comprises
controlling the analysis device to start the executing by using the analysis rule by controlling the analysis rule selected based on highness of the evaluation result from among analysis rules of the analysis of which execution is stopped, when the amount of available resources satisfies a predetermined surplus condition.

3. The information processing system according to claim 1, further comprising
  another analysis device including
  a third memory, and
  at least one third processor coupled to the third memory, the third processor configured to perform third operations, the third operations including:
  at least executing analysis, based on an analysis rule with respect to data to be input as an object of analysis, outputting an analysis result, and managing the analysis rule,
  the third memory storing the analysis rule.

4. The information processing system according to claim 3, wherein
the second operations further comprises
controlling the analysis rule stored in the another analysis device via the another analysis device, in such a way that the another analysis device executes analysis based on the analysis rule, when controlling the analysis device not to execute analysis based on the analysis rule.

5. A method for a computer device to control an analysis device,
the analysis device including
  a first memory, and
  at least one first processor coupled to the first memory, the first memory
    storing a first entry including an analysis rule, and
    storing a second entry including analysis state information indicating a state of an analysis to be generated or referred to by the first processor,
the method comprising:
executing the analysis, by using the analysis rule included in the first entry stored in the first memory, with respect to data to be input from at least one sensor as an object of analysis;
storing the analysis state information to the second entry in the first memory when detecting the analysis state information during the analysis;
outputting an analysis result to an evaluation device;
managing the analysis rule;
monitoring a usage status of the first memory with respect to the second entry including the analysis state information;
acquiring an evaluation result with respect to the analysis result from the evaluation device and storing the evaluation result into a third entry in a second memory;
controlling the analysis rule via included in the first entry stored in the first memory of the analysis device, by using the usage status of the first memory with respect to the second entry including the analysis state information and the evaluation result included in the third entry in the second memory;
determining whether the usage status satisfies a predetermined depletion condition;
determining the analysis rule as an object to be invalidated, by using lowness of the evaluation result included in the third entry stored in the second memory when the usage status satisfies the predetermined depletion condition;
invalidating the analysis rule determined as the object to be invalidated; and
deleting, from the first memory, the second entries including the analysis state information related to the invalidated analysis rule,
wherein the usage status of the first memory includes at least a number of second entries stored in the first memory.

6. A non-transitory computer-readable storage medium storing a program, the program causing a computer device to control an analysis device to perform a method,
the analysis device including
a first memory, and
at least one first processor coupled to the first memory,
the first memory
storing a first entry including an analysis rule, and
storing a second entry including analysis state information indicating a state of an analysis to be generated or referred to by the first processor,
the method comprising:
executing the analysis, by using the analysis rule included in the first entry stored in the first memory, with respect to data to be input from at least one sensor as an object of analysis;
storing the analysis state information to the second entry in the first memory when detecting the analysis state information during the analysis;
outputting an analysis result to an evaluation device;
managing the analysis rule;
monitoring a usage status of the first memory with respect to the second entry including the analysis state information;
acquiring an evaluation result with respect to the analysis result from the evaluation device and storing the evaluation result into a third entry in a second memory;
controlling the analysis rule included in the first entry stored in the first memory of the analysis device, by using the usage status of the first memory with respect to the second entry including the analysis state information and the evaluation result included in the third entry in the second memory;
determining whether the usage status satisfies a predetermined depletion condition;
determining the analysis rule as an object to be invalidated, by using lowness of the evaluation result included in the third entry stored in the second memory when the usage status satisfies the predetermined depletion condition;
invalidating the analysis rule determined as the object to be invalidated; and
deleting, from the first memory, the second entries including the analysis state information related to the invalidated analysis rule,
wherein the usage status of the first memory includes at least a number of second entries stored in the first memory.

* * * * *